United States Patent
Toyama et al.

(10) Patent No.: US 7,287,240 B2
(45) Date of Patent: *Oct. 23, 2007

(54) DESIGNING METHOD AND DEVICE FOR PHASE SHIFT MASK

(75) Inventors: Nobuhito Toyama, Tokyo (JP); Yasutaka Morikawa, Tokyo (JP); Kei Mesuda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 585 days.

This patent is subject to a terminal disclaimer.

(21) Appl. No.: 10/497,743

(22) PCT Filed: Dec. 10, 2002

(86) PCT No.: PCT/JP02/12932

§ 371 (c)(1),
(2), (4) Date: Jun. 4, 2004

(65) Prior Publication Data

US 2006/0141365 A1 Jun. 29, 2006

(30) Foreign Application Priority Data

Dec. 11, 2001 (JP) ............................. 2001-376743

(51) Int. Cl.
G06F 7/50 (2006.01)
G06F 19/00 (2006.01)
G03F 1/00 (2006.01)
G21K 5/00 (2006.01)

(52) U.S. Cl. .................... 716/21; 700/120; 700/121; 430/5; 378/35; 250/492.22; 250/492.23

(58) Field of Classification Search ............... 716/21; 700/120, 121; 430/5; 378/35; 250/492.22, 250/492.23
See application file for complete search history.

(56) References Cited

U.S. PATENT DOCUMENTS 4,473,750 A * 9/1984 Oshida et al. ......... 250/559.23
6,159,642 A 12/2000 Kawano et al.
6,198,982 B1 * 3/2001 Park et al. .................. 700/121
6,387,573 B1 * 5/2002 Park et al. ...................... 430/5
2002/0058188 A1 * 5/2002 Iwasaki et al. ................. 430/5
2004/0101766 A1 5/2004 Mesuda et al.

FOREIGN PATENT DOCUMENTS

JP 10-333316 12/1998

OTHER PUBLICATIONS

Pierrat, et al; "Phase-Shifting Mask Topography Effects on Lithographic Image Quality"; Proc. SPIE; vol. 1927 (1993) pp. 28-41.

* cited by examiner

*Primary Examiner*—Phallaka Kik
(74) *Attorney, Agent, or Firm*—Ladas and Parry LLP

(57) ABSTRACT

A planar pattern (11), having a plurality of apertures of the same size (Wx×Wy), is determined by a two-dimensional layout determination tool (10), and a three-dimensional structure, having a depth d and an undercut amount Uc for making the phase of the transmitted light be shifted by 180 degrees with every even-numbered aperture, is determined by a three-dimensional structure determination tool (20). Simulation of transmitted light is executed for a structural body having the planar pattern (11) and the three-dimensional structure (21) by a three-dimensional simulator (30) to determine the light intensity deviation D of transmitted light for an odd-numbered aperture without a trench and an even-numbered aperture with a trench. At a two-dimensional simulator (40), simulations using a two-dimensional model prepared based on this deviation D are performed to determine a correction amount δ for making the deviation D zero and obtain a new planar pattern (12). The work load spent on designing a trench-type, Levenson-type phase shift mask can be lightened and the working time for the designing process can be shortened.

20 Claims, 15 Drawing Sheets

LIGHT INTENSITY DEVIATION
D = Wa − Wb

DESIGNING METHOD AND DEVICE FOR PHASE SHIFT MASK

TECHNICAL FIELD

This invention relates to a designing method and device for phase shift mask, and in particular, relates to an art for correcting drawing data for designing a trench-type, Levenson-type phase shift mask to be used for manufacture of semiconductor devices.

BACKGROUND ART

Semiconductor devices are being made higher in density from year to year and the integrated circuit patterns formed on semiconductor wafers are becoming even finer. Exposure using a photomask is normally performed in forming an integrated circuit pattern on a semiconductor wafer, and the pattern on a photomask inevitably becomes finer as the pattern to be exposed becomes finer. Especially since the latter half of the 1990's, technical developments are actively being made towards forming fine shapes of sizes shorter than the light source wavelength of an exposure tool on a semiconductor wafer.

Generally in forming a fine pattern of a size near or no more than an exposure tool's light source wavelength on a semiconductor wafer, the diffraction phenomenon of light cannot be ignored. Specifically, in a case where a pair of mutually adjacent apertures are formed as a photo mask pattern, the lights transmitted through the pair of apertures diffract and interfere with each other, causing exposure even at parts that are supposed to be shielded from light. Thus with a photomask on which a fine pattern is formed, measures must be devised in consideration of the diffraction phenomenon of light. A phase shift mask is known as a type of photomask with which such a measure is taken. The basic principle of a phase shift mask is that a structure, with which the phases of the light transmitted through a pair of adjacently disposed apertures will be opposite each other, is employed to cancel out the interference of light. As a method of shifting the phase of light that is transmitted through one of the apertures by 180 degrees with respect to the phase of light that is transmitted through the other aperture, a method of forming a trench in the substrate that makes up the photomask has been proposed. For example, Laid-open Japanese Patent Publication No. 2002-40624 discloses a trench-type, Levenson-type phase shift mask as a typical example of such a phase shift mask.

As mentioned above, with a phase shift mask, since the shape of a fine pattern must be determined in consideration of the diffraction phenomenon of light, the design work is complicated. Especially with a trench-type, Levenson-type phase shift mask, in which a trench is formed in a substrate, since the part at which the trench is formed takes on a three-dimensional structure, two-dimensional analysis is insufficient and the need to perform three-dimensional analysis arises. Much labor and time were thus required to design a single phase shift mask.

An object of this invention is thus to provide a designing method and device for phase shift mask which enable the work load to be lightened and the working time to be shortened.

DISCLOSURE OF INVENTION (1) The first feature of the present invention resides in the method for designing a phase shift mask, having a substrate with a transparent property, and an opaque layer formed on the substrate and having an opaque property, wherein a plurality of rectangular apertures are formed in the opaque layer, a two-dimensional layout pattern is formed by opaque parts comprising regions at which the opaque layer is formed, and transparent parts comprising regions at which the apertures are formed, and for a pair of adjacently disposed apertures, so that a phase of light transmitted through one of the pair of adjacent apertures will be shifted by 180 degrees with respect to a phase of light transmitted through the other of the pair of adjacent apertures, a trench, having a predetermined depth and an outline greater than an outline of the one aperture, is formed on a portion of the substrate at which the one aperture is formed, the phase shift mask designing method comprising the steps of:

a two-dimensional layout designing step of defining an XY plane on a surface of the substrate, determining a width Wx in the X-axis direction and a width Wy in the Y-axis direction of each aperture and a width Ws of each opaque part, and positioning a plurality of apertures of the same size at least along the X-axis to thereby design a two-dimensional layout on the XY plane;

a three-dimensional structure determination step of determining, for each of the plurality of apertures, whether or not phase shifting is to be performed and determining, for the apertures with which phase shifting is to be performed, a trench depth d and an undercut amount Uc, which indicates a distance between a position of the outline of the trench and a position of the outline of the aperture, to thereby determine a three-dimensional structure;

a three-dimensional analysis step of using a three-dimensional structural body, which is defined by the two-dimensional layout and the three-dimensional structure, to determine a light intensity deviation D, which indicates, for a case where light is transmitted under the same exposure conditions through a pair of adjacent apertures that have been designed to realize a phase shift of 180 degrees with respect to each other, a deviation in intensities of light transmitted through the respective apertures;

a two-dimensional analysis step of using a two-dimensional structural body, which is defined by the two-dimensional layout, to determine, in a case where, for the pair of adjacent apertures, a light transmittance of one aperture is set to 100% and a light transmittance of the other aperture is set to T %, a transmittance T such that a deviation in intensities of light transmitted through each of the pair of adjacent apertures will be equal to the light intensity deviation D; and a layout correction step of correcting the two-dimensional layout based on the transmittance T.

(2) The second feature of the present invention resides in the phase shift mask designing method according to the first feature, wherein in the two-dimensional analysis step, a light intensity deviation D is determined for each of a plurality of transmittances and a transmittance, which provides a result matching the light intensity deviation D determined in the three-dimensional analysis step, is determined as the transmittance T.

(3) The second feature of the present invention resides in the phase shift mask designing method according to the second feature, wherein in the two-dimensional analysis step, a database, with which a value of the light intensity deviation D is determined for each of various different combinations of parameter values of the width Wx in the X-direction of each aperture, the width Ws of each opaque part, and the transmittance T, is prepared in advance, and in determining a light intensity deviation D for a specific two-dimensional structural body, the database is searched to determine the light intensity deviation D.

(4) The fourth feature of the present invention resides in the phase shift mask designing method according to the first feature, wherein in the three-dimensional analysis step, a database, with which a value of the light intensity deviation D is determined for each of various different combinations of parameter values of the width Wx in the X-direction of each aperture, the width Ws of each opaque part, and the undercut amount Uc, is prepared in advance, and in determining a light intensity deviation D for a specific three-dimensional structural body, the database is searched to determine the light intensity deviation D.

(5) The fifth feature of the present invention resides in the phase shift mask designing method according to the first feature, wherein in the layout correction step, a database, with which an optimal correction amount δ is determined for each of various different combinations of parameter values of the width Wx in the X-direction of each aperture, the width Ws of each opaque part, and the transmittance T, is prepared in advance, and in performing a correction of a specific two-dimensional layout, with which a specific transmittance is defined, the database is searched to determine the optimal correction amount δ.

(6) The sixth feature of the present invention resides in the phase shift mask designing method according to the first to the third features, wherein a database, having the width Wy in the Y-axis direction of each aperture in addition as a parameter value, is prepared.

(7) The seventh feature of the present invention resides in the phase shift mask designing method according to the first to the third features, wherein in a case where a combination of parameter values that matches the search conditions does not exist among combinations of parameters prepared inside the database, an interpolation operation using parameter values that are close is performed.

(8) The eighth feature of the present invention resides in the phase shift mask designing method according to the first to the third features, wherein in the two-dimensional layout designing step, a plurality of apertures are positioned in two-dimensional matrix form in the X-axis direction and the Y-axis direction, and as the width Ws of the opaque parts, two parameters of a width Wsx in the X-axis direction of an opaque part existing between apertures that are adjacent in the X-axis direction and a width Wsy in the Y-axis direction of an opaque part existing between apertures that are adjacent in the Y-axis direction are used.

(9) The ninth feature of the present invention resides in the phase shift mask designing method according to the first feature, wherein in the three-dimensional structure determination step, apertures with which phase shifting is to be performed are determined so that every other aperture of the plurality of apertures that are positioned along the X-axis direction or the Y-axis direction are selected.

(10) The tenth feature of the present invention resides in the phase shift mask designing method according to the first feature, wherein a part or all of the process of determining the light intensity deviation D in the three-dimensional analysis step, the process of determining the transmittance T in the two-dimensional analysis step, and the correction process in the layout correction step are executed using computer simulation.

(11) The eleventh feature of the present invention resides in the phase shift mask designing method according to the first feature, wherein a part or all of the process of determining the light intensity deviation D in the three-dimensional analysis step, the process of determining the transmittance T in the two-dimensional analysis step, and the correction process in the layout correction step are executed by experimentation using an actually manufactured phase shift mask.

(12) The twelfth feature of the present invention resides in the device for designing a phase shift mask, having a substrate with a transparent property, and an opaque layer formed on the substrate and having an opaque property, wherein a plurality of rectangular apertures are formed in the opaque layer, a two-dimensional layout pattern is formed by opaque parts comprising regions at which the opaque layer is formed, and transparent parts comprising regions at which the apertures are formed, and for a pair of adjacently disposed apertures, so that a phase of light transmitted through one of the pair of adjacent apertures will be shifted by 180 degrees with respect to a phase of light transmitted through the other of the pair of adjacent apertures, a trench, having a predetermined depth and an outline greater than an outline of the one aperture, is formed on a portion of the substrate at which the one aperture is formed, the phase shift mask designing device comprising:

a two-dimensional layout determination tool, which, based on instructions from an operator, determines a width Wx in the X-axis direction and a width Wy in the Y-axis direction of each aperture and a width Ws of each opaque part on an XY plane defined on a surface of the substrate and positions a plurality of apertures of the same size at least along the X-axis to determine a two-dimensional layout on the XY plane;

a three-dimensional structure determination tool, which, based on instructions from an operator, determines whether or not phase shifting is to be performed for each of the plurality of apertures and determines, for apertures with which phase shifting is to be performed, a trench depth d and an undercut amount Uc, which indicates a distance between a position of the outline of the trench and a position of the outline of the aperture, to thereby determine a three-dimensional structure;

a three-dimensional simulator, which performs a three-dimensional analysis process of executing a three-dimensional simulation using a three-dimensional structural body, which is defined by the two-dimensional layout and the three-dimensional structure, as a model to determine a light intensity deviation D that indicates a deviation of intensities of light transmitted through each of a pair of adjacent apertures, designed to realize a phase shift of 180 degrees with respect to each other, when light is transmitted through the apertures under the same conditions; and a two-dimensional simulator, which performs a two-dimensional analysis process of executing two-dimensional simulations using a two-dimensional structural body, which is defined by the two-dimensional layout, as a model to determine a transmittance T, such that, when for a pair of adjacent apertures, a light transmittance of one aperture is set to 100% and a light transmittance of the other aperture is set to T %, a deviation in intensities of light transmitted through each of the pair of adjacent apertures becomes equal to the light intensity deviation D, and performs a layout correction process of executing two-dimensional simulations using a model, with which the transmittance T is applied to the two-dimensional structural body defined by the two-dimensional layout, to correct the two-dimensional layout.

(13) The thirteenth feature of the present invention resides in the phase shift mask designing device according to the twelfth feature, wherein when the two-dimensional simulator performs the two-dimensional analysis process, a light intensity deviation D is determined for each of a plurality of transmittances, and a transmittance, which provides a result matching the light intensity deviation D determined by the three-dimensional analysis process performed by the three-dimensional simulator, is determined as the transmittance T.

(14) The fourteenth feature of the present invention resides in the phase shift mask designing device according to the twelfth feature, wherein a database, in which light intensity deviations D, each defined as a value that indicates a deviation of intensities of light transmitted through each of a pair of adjacent apertures, which are of a predetermined three-dimensional structural body and are designed to realize a phase shift of 180 degrees with respect to each other, when light is transmitted through the apertures under the same conditions, are stored according to various different combinations of parameter values of the width Wx in the X-direction of each aperture, the width Ws of each opaque part, and the undercut amount Uc; and a light intensity deviation determination tool, which determines a specific light intensity deviation D by searching the database using specific parameter values determined by the two-dimensional layout determination tool and the three-dimensional structure determination tool;

are provided as an alternative means to the three-dimensional simulator.

(15) The fifteenth feature of the present invention resides in the phase shift mask designing device according to the twelfth feature, wherein a database, in which light intensity deviations D, each defined as a value that indicates a deviation of intensities of light transmitted through each of a pair of adjacent apertures, which are of a predetermined two-dimensional structural body and with which a transmittance of one has been set to 100% and a transmittance of the other has been set to T %, when light is transmitted through the apertures under the same conditions, are stored according to various different combinations of parameter values of the width Wx in the X-direction of each aperture, the width Ws of each opaque part, and the transmittance T; and a transmittance determination tool, which searches the database using specific parameter values determined by the two-dimensional layout determination tool and a specific light intensity deviation D determined by the three-dimensional simulator to determine a transmittance T, by which a light intensity deviation equal to the specific light intensity deviation D is obtained;

are provided as an alternative means to the two-dimensional simulator for executing the two-dimensional analysis process.

(16) The sixteenth feature of the present invention resides in the phase shift mask designing device according to the twelfth feature, wherein a database, in which correction amounts δ, each of which concerns widths of the respective apertures and is required to make equal the intensities of light transmitted under the same conditions through each of a pair of adjacent apertures, which are of a predetermined two-dimensional structural body, are of the same size, and with which a transmittance of one has been set to 100% and a transmittance of the other has been set to T %, are stored according to various different combinations of parameter values of the width Wx in the X-direction of each aperture, the width Ws of each opaque part, and the transmittance T; and a correction amount determination tool, which searches the database using specific parameter values determined by the two-dimensional layout determination tool and a specific transmittance T determined by the two-dimensional analysis process performed by the two-dimensional simulator to determine a correction amount δ for the two-dimensional layout;

are provided as an alternative means to the two-dimensional simulator for executing the layout correction process.

(17) The seventeenth feature of the present invention resides in the device for designing a phase shift mask, having a substrate with a transparent property, and an opaque layer formed on the substrate and having an opaque property, wherein a plurality of rectangular apertures are formed in the opaque layer, a two-dimensional layout pattern is formed by opaque parts comprising regions at which the opaque layer is formed, and transparent parts comprising regions at which the apertures are formed, and for a pair of adjacently disposed apertures, so that a phase of light transmitted through one of the pair of adjacent apertures will be shifted by 180 degrees with respect to a phase of light transmitted through the other of the pair of adjacent apertures, a trench, having a predetermined depth and an outline greater than an outline of the one aperture, is formed on a portion of the substrate at which the one aperture is formed, the phase shift mask designing device comprising:

a two-dimensional layout determination tool, which, based on instructions from an operator, determines a width Wx in the X-axis direction and the width Wy in the Y-axis direction of each aperture and a width Ws of each opaque part on an XY plane defined on a surface of the substrate and positions a plurality of apertures of the same size at least along the X-axis to determine a two-dimensional layout on the XY plane;

a three-dimensional structure determination tool, which, based on instructions from an operator, determines whether or not phase shifting is to be performed for each of the plurality of apertures and determines, for apertures with which phase shifting is to be performed, a trench depth d and an undercut amount Uc, which indicates a distance between a position of the outline of the trench and a position of the outline of the aperture, to thereby determine a three-dimensional structure;

a first database, in which light intensity deviations D, each defined as a value that indicates a deviation of intensities of light transmitted through each of a pair of adjacent apertures, which are of a predetermined three-dimensional structural body and are designed to realize a phase shift of 180 degrees with respect to each other, when light is transmitted through the apertures under the same conditions, are stored according to various different combinations of parameter values of the width Wx in the X-direction of each aperture, the width Ws of each opaque part, and the undercut amount Uc;

a light intensity deviation determination tool, which determines a specific light intensity deviation D by searching the first database using specific parameter values determined by the two-dimensional layout determination tool and the three-dimensional structure determination tool;

a second database, in which light intensity deviations D, each defined as a value that indicates a deviation of intensities of light transmitted through each of a pair of adjacent apertures, which are of a predetermined two-dimensional structural body and with which a transmittance of one has been set to 100% and a transmittance of the other has been set to T %, when light is transmitted through the apertures under the same conditions, are stored according to various different combinations of parameter values of the width Wx in the X-direction of each aperture, the width Ws of each opaque part, and the transmittance T;

a transmittance determination tool, which searches the second database using specific parameter values determined by the two-dimensional layout determination tool and a specific light intensity deviation D determined by the light intensity deviation determination tool to determine a transmittance T, by which a light intensity deviation equal to the specific light intensity deviation D is obtained;

a third database, in which correction amounts, each of which concerns widths of the respective apertures and is required to make equal the intensities of light transmitted under the same conditions through each of a pair of adjacent apertures, which are of a predetermined two-dimensional structural body, are of the same size, and with which a transmittance of one has been set to 100% and a transmittance of the other has been set to T %, are stored according to various different combinations of parameter values of the width Wx in the X-direction of each aperture, the width Ws of each opaque part, and the transmittance T; and a correction amount determination tool, which searches the third database using specific parameter values determined by the two-dimensional layout determination tool and a specific transmittance T determined by the transmittance determination tool to determine a correction amount δ for the two-dimensional layout.

(18) The eighteenth feature of the present invention resides in the phase shift mask designing device according to the fourteenth to the seventeenth features, wherein a database, having the width Wy in the Y-axis direction of each aperture in addition as a parameter value, is prepared.

(19) The nineteenth feature of the present invention resides in the phase shift mask designing device according to the fourteenth to the seventeenth features, wherein in order to accommodate for a two-dimensional layout, with which a plurality of apertures are positioned in two-dimensional matrix form in the X-axis direction and the Y-axis direction, two parameters of a width Wsx in the X-axis direction of an opaque part existing between apertures that are adjacent in the X-axis direction and a width Wsy in the Y-axis direction of an opaque part existing between apertures that are adjacent in the Y-axis direction are used as parameter values in the database as the width Ws of the opaque parts.

(20) The twentieth feature of the present invention resides in the phase shift mask designing device according to the fourteenth to the seventeenth features, wherein in a case where a combination of parameter values that matches the search conditions does not exist among combinations of parameters prepared inside the database, the light intensity deviation determination tool, transmittance determination tool, or correction amount determination tool performs an interpolation operation using parameter values that are close to determine the light intensity deviation D, transmittance T, or correction amount δ.

BEST MODE FOR CARRYING OUT THE INVENTION

This invention shall now be described based on the illustrated embodiments.

<<<§ 1. Basic Structure of a Phase Shift Mask>>>

Figure 1:
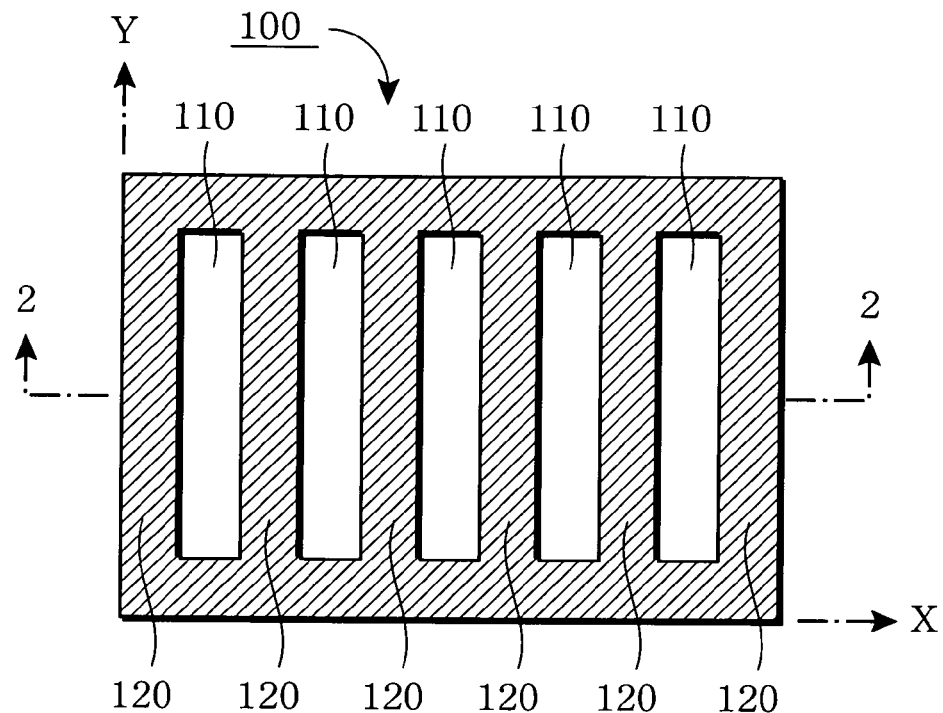
FIG. 1 is a plan view, showing a photomask with a general, two-dimensional layout pattern (the hatching indicates opaque parts and not cross sections).

A photomask used for forming an integrated circuit pattern on a semiconductor wafer is basically a two-dimensional layout pattern arranged from opaque parts and transparent parts. FIG. 1 is a plan view, showing a photomask with such a two-dimensional layout pattern. An opaque layer 100 is formed on the upper surface of this photomask and this opaque layer has the two regions of transparent parts 110 and opaque parts 120. As illustrated, each transparent part 110 is arranged as a rectangular aperture and opaque parts 120 are arranged in the form of a frame that surrounds these apertures. The hatched parts in the Figure indicate the regions of opaque parts 120 and not cross sections.

Figure 2:
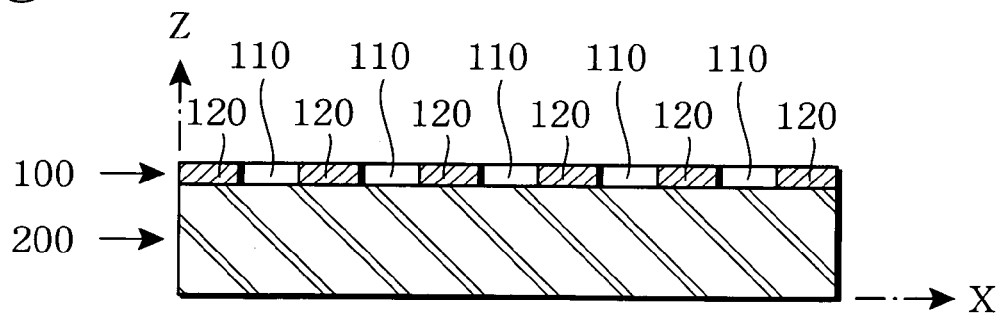
FIG. 2 is a sectional side view, showing a section along line 2-2 of the photomask shown in FIG. 1.

FIG. 2 is a sectional side view, showing the section along line 2-2 of the photomask shown in FIG. 1. As is illustrated, this photomask is arranged from a transparent substrate 200 and an opaque layer 100, which has an opaque property and is formed on substrate 200. Substrate 200 is formed of a material such as quartz glass, etc., and opaque layer 100 is formed of a material such as a metal film of chromium, etc. Transparent parts 110 are aperture parts formed in opaque layer 100. When light from an exposure tool is illuminated under predetermined illumination conditions onto this photomask, the light is shielded at the portions of opaque parts 120 and transmitted only through the portions of transparent parts 110.

Figure 3:
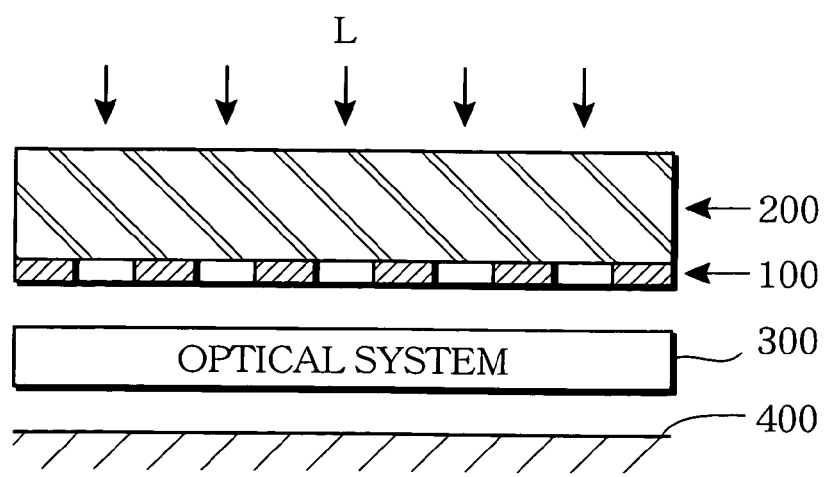
FIG. 3 is a sectional side view, illustrating the exposure work that is performed using the photomask shown in FIG. 1 (optical system 300 is indicated as a block).

FIG. 3 is a sectional side view, illustrating the exposure work that is performed using this photomask. As is illustrated, the photomask is normally positioned so that substrate 200 will be at the upper side and opaque layer 100 will be at the lower side and the light L from the exposure tool is illuminated from above. Also, a prescribed optical system 300 (indicated as a block in the Figure) is disposed below the photomask, and the light that is transmitted through the photomask is illuminated onto an exposed surface 400 of a semiconductor wafer via this optical system 300. As a result, exposed surface 400 is exposed to a two-dimensional layout pattern, such as that shown in FIG. 1.

For the sake of convenience, the X-axis shall be set, as shown in FIG. 1, in the transverse direction of the Figure, the Y-axis shall be set in the vertical direction of the Figure, the XY plane shall be defined as the surface of substrate 200, and the two-dimensional layout pattern formed by opaque layer 100 shall be the pattern defined on this XY plane in the description that follows. As shown in FIG. 2, the Z-axis is thus defined in the direction perpendicular to the main surface of substrate 200 and the light L from the exposure tool is thus illuminated in the Z-axis direction.

The two-dimensional layout pattern shown in FIG. 1 is a typical pattern called a "line and space pattern" with which a plurality of apertures of the same size are disposed along the X-axis. This invention is premised on designing a photomask containing such a two-dimensional layout pattern in which a plurality of rectangular apertures of the same size are disposed along the X-axis.

A two-dimensional layout pattern for an actual semiconductor integrated circuit is not necessarily arranged from just such a pattern in which a plurality of rectangular apertures of the same size are disposed and it is not rare for a pattern to take on a form where L-shaped apertures, U-shaped apertures, and other apertures of irregular shape coexist as necessary. However, a "line and space pattern" in which a plurality of rectangular apertures of the same size are disposed, is a pattern that is most frequently used in practical applications as a two-dimensional layout pattern for a general semiconductor integrated circuit and it is not an overstatement to say that most regions are taken up by such a "line and space pattern". The designing method of the present invention is an art that can be used widely in designing such a "line and space pattern" part and is an art of extremely high value of use in designing a photomask for a general semiconductor integrated circuit.

Though for the sake of convenience, the example shown in FIG. 1 is a comparatively simple example in which rectangular apertures are formed at five locations, in actuality, a layout pattern, with which a larger number of apertures are disposed along the X-axis at a predetermined pitch, is generally used.

In a case where a photomask such as that shown in FIG. 1 is prepared with the dimensions that are actually indicated in the drawing, the light L that is illuminated from the exposure tool in FIG. 3 behaves as particles and the light that is transmitted through an aperture of opaque layer 100 proceeds rectilinearly as it is and exposes the surface of exposed surface 400. An exposure pattern equivalent to the two-dimensional layout pattern shown in FIG. 1 is thus obtained on the exposed surface 400. However, circumstances will differ if the respective parts of the pattern of a photomask such as that shown in FIG. 1 are prepared with a size near or no more than the wavelength of the light source of the exposure tool. When the size of an aperture becomes close to the wavelength of light, the light L that is illuminated from the exposure tool begins to behave as a wave and the diffraction phenomenon that occurs in the process of transmission through the aperture becomes non-negligible.

Figure 4:
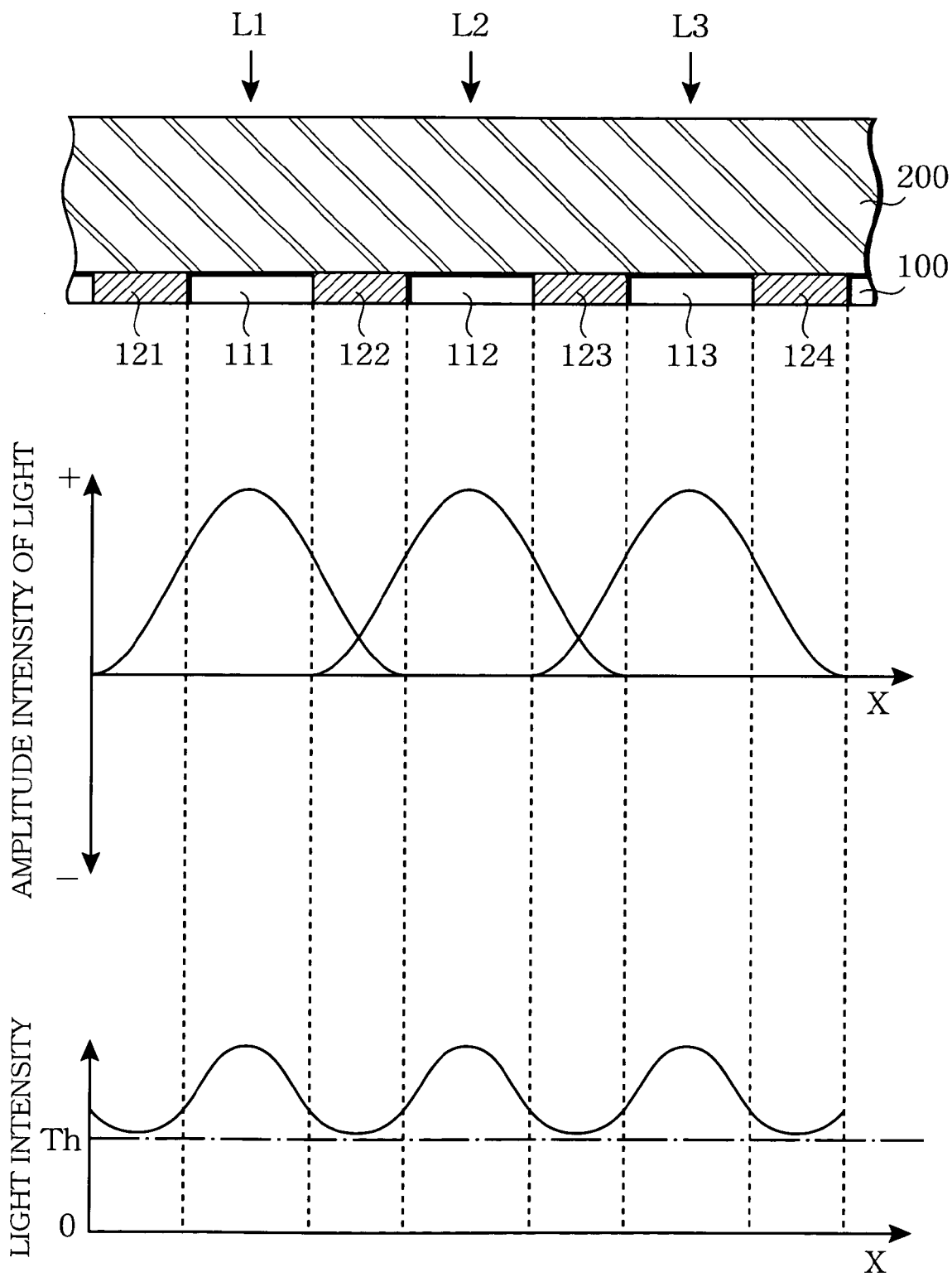
FIG. 4 shows diagrams that illustrate the behavior of light transmitted through apertures of a photomask with the occurrence of diffraction phenomenon taken into consideration, the upper diagram being a partially enlarged sectional side view of the photomask, the middle diagram showing graphs of the amplitude intensity distributions of the light transmitted through the photomask, and the lower diagram being a graph, showing the light intensity distribution of the light transmitted through the photomask.

FIG. 4 shows diagrams that illustrate the behavior of light transmitted through apertures of a photomask with the diffraction phenomenon taken into consideration, the upper diagram being a partially enlarged sectional side view of the photomask, the middle diagram showing graphs of the amplitude intensity distributions of the light transmitted through the photomask, and the lower diagram showing a graph of the light intensity distribution of the light transmitted through the photomask.

As shown in the upper diagram of the Figure, though illumination light L1, L2, and L3 from the exposure tool are respectively transmitted through apertures 111, 112, and 113 and proceed toward the exposed surface below the photomask, since the diffraction phenomenon of light occurs in this process, parts of the transmitted light become diffracted towards portions of opaque parts 121, 122, 123, and 124. As a result, the amplitude intensity of light (here, the amplitude intensity that takes the sign into consideration is illustrated) will be as shown in the graph of the middle diagram. The abscissa of these graphs corresponds to the spatial position in the X-axis direction of the photomask, and it can be seen that amplitude intensities with peaks at the central positions of the respective apertures 111, 112, and 113 are obtained.

Since all of the light that are thus transmitted through the photomask are light of the same phase, they intensify each other at the overlapping parts of the graphs of the middle diagram of the Figure, and consequently, the light intensity distribution of the transmitted light will be that of the graph of the lower diagram of the Figure that is obtained by adding the amplitude intensity values of the respective graphs. That is, though the light intensity at the regions of the exposed surface of the semiconductor wafer that correspond to the respective apertures 111, 112, and 113 will be relatively high, the light intensity will also come to take on a certain magnitude even at regions corresponding to opaque parts 121, 122, 123, and 124. Thus, if for example the threshold value Th of the light intensity that is necessary for exposing a resist layer that is formed on the exposed surface is of the value indicated in the graph of the lower diagram of the Figure, all regions of the exposed surface will be exposed in the case of the illustrated example and the image of the original pattern will not be formed.

Figure 5:
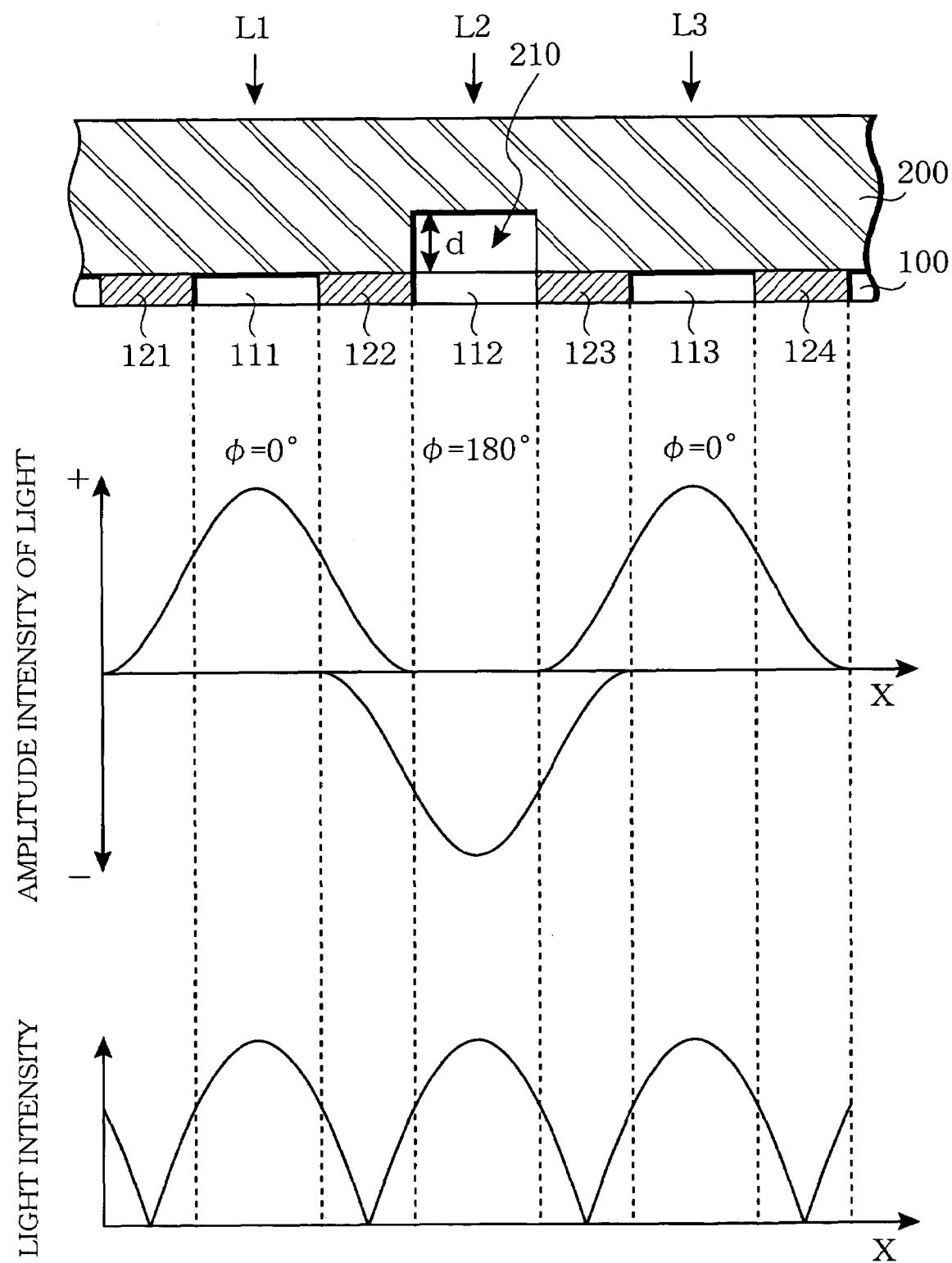
FIG. 5 shows diagrams that illustrate the ideal behavior of light transmitted through apertures of a phase shift mask with the occurrence of diffraction phenomenon taken into consideration, the upper diagram being a partially enlarged sectional side view of the phase shift mask, the middle diagram showing graphs of the amplitude intensity distributions of the light transmitted through this phase shift mask, and the lower diagram being a graph, showing the light intensity distribution of the light transmitted through this phase shift mask.

A phase shift mask is used as a method for counteracting such a problem. FIG. 5 shows diagrams that illustrate the behavior of light transmitted through apertures of a phase shift mask under predetermined conditions and with the occurrence of diffraction phenomenon taken into consideration, the upper diagram being a partially enlarged sectional side view of the phase shift mask, the middle diagram showing graphs of the amplitude intensity distributions of the light transmitted through this phase shift mask, and the lower diagram being a graph, showing the light intensity distribution of the light transmitted through this phase shift mask. The difference between the ordinary photomask shown in the upper diagram of FIG. 4 and the phase shift mask shown in the upper diagram of FIG. 5 is that, with the latter, a trench 210 of a depth d is formed at apart of substrate 200. With the illustrated example, trench 210 is formed at a region in which aperture 112 is formed and a trench is not formed at regions in which apertures 111 and 113 are formed.

Here, trench 210 serves to shift the phase of light L2 that is transmitted through aperture 112 by 180 degrees. In other words, the depth d of trench 210 is set to a length that is necessary for shifting the phase of light of the wavelength of the light source of the exposure tool by just 180 degrees. When illumination light L1, L2, and L3 from the exposure tool are illuminated onto such a phase shift mask, though these light are transmitted through apertures 111, 112, and 113 and proceed toward the exposed surface below the photomask, the light L2 that is transmitted through aperture 112 will be shifted in phase by just 180 degrees. Here, the phases $\phi$ of the light L1 and L3 that are transmitted through apertures 111 and 113 are indicated as taking on the reference value of 0 degree and the phase of the light L2 that is transmitted through aperture 112 is indicated as being 180 degrees. When a phase shift occurs with part of such light that are transmitted through the phase shift mask, the amplitude intensities that take the signs of the transmitted light into consideration will be as shown by the graphs of the middle diagram of the Figure. Since the phase of light L2 is inverted with respect to the phases of light L1 and L3, the sign of its amplitude will be inverted as well.

Consequently, the overlapping parts of the graphs shown in the middle diagram of the Figure weaken each other and the synthesized amplitude will be a result of addition of the amplitude intensity values of the graphs in consideration of the signs of the values. Since the light intensity distribution of transmitted light is the square of the amplitude, it will be as shown in the graph of the lower diagram of the Figure. The light intensity will thus be relatively high at regions of the exposed surface of the semiconductor wafer that correspond to the respective apertures 111, 112, and 113 and be relatively low at regions corresponding to opaque parts 121, 122, 123, and 124. If such an adequate difference in light intensity can be obtained between regions corresponding to apertures and regions corresponding to opaque parts, an image of the originally intended pattern can be formed on the exposed surface.

The basic principle of a phase shift mask is thus to employ a structure, such that the phases of light transmitted through a pair of adjacently disposed apertures will be inverted, to cancel out the interference of light at the opaque parts. With a trench type phase shift mask, the method, wherein, for a pair of adjacently disposed apertures, a trench, having a predetermined depth d, is formed at the substrate part at which one of the apertures is formed so that the phase of the light transmitted through this one aperture will be shifted by 180 degrees with respect to the phase of the light transmitted through the other aperture, is taken.

Figure 6:
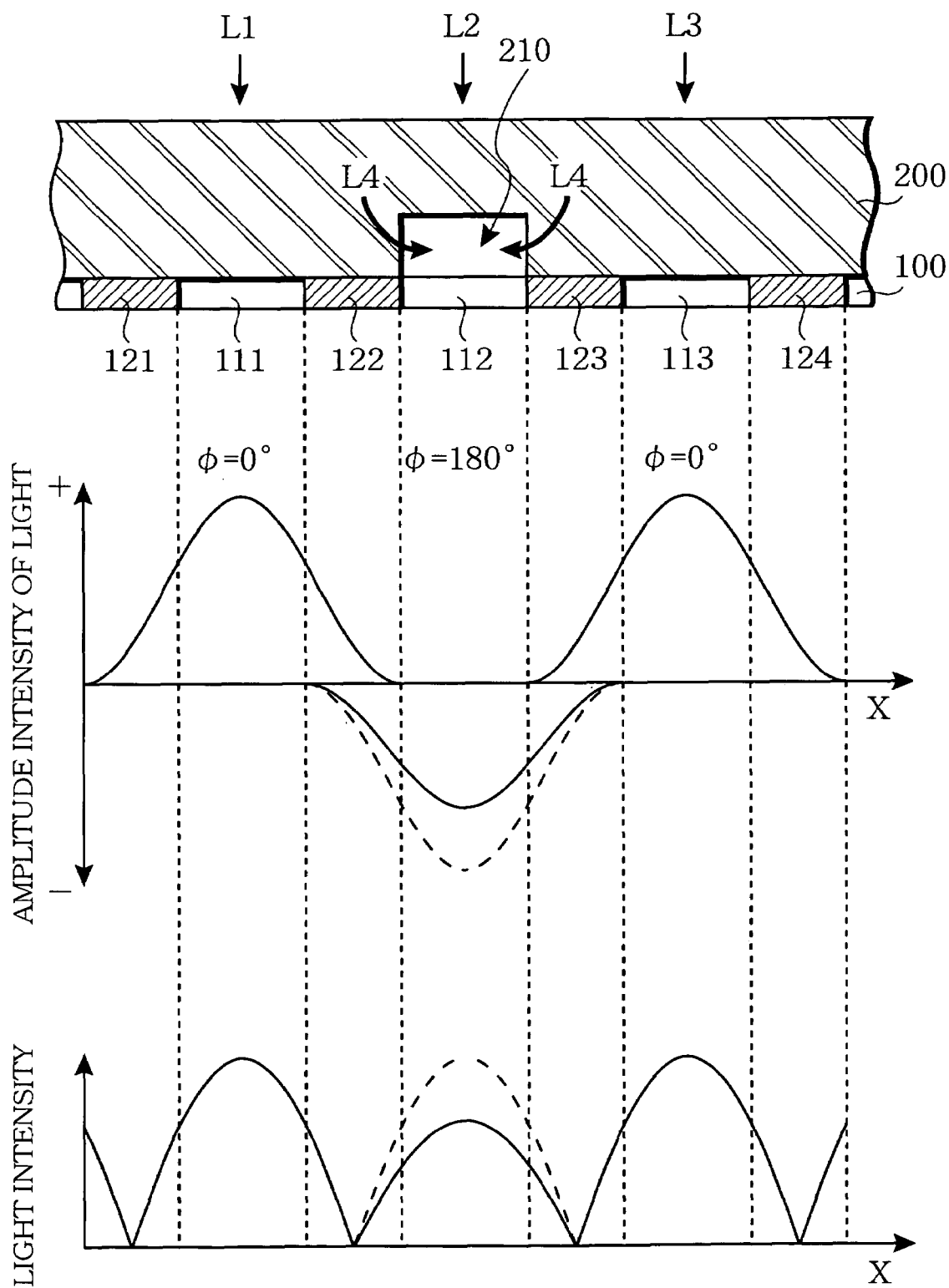
FIG. 6 shows diagrams that illustrate the real behavior of light transmitted through apertures of a phase shift mask with the diffraction phenomenon taken into consideration, the upper diagram being a partially enlarged sectional side view of the phase shift mask, the middle diagram showing graphs of the amplitude intensity distributions of the light transmitted through this phase shift mask, and the lower diagram being a graph, showing the light intensity distribution of the light transmitted through this phase shift mask.

However, it is known that, in actuality, when a trench 210 such as that shown in the upper diagram of FIG. 5 is formed, an ideal light intensity distribution such as that shown in the lower diagram of FIG. 5 will not be obtained. FIG. 6 shows diagrams that illustrate the real behavior of light transmitted through apertures of a phase shift mask. With the middle diagram of FIG. 6, though the graph indicated by a broken line indicates the ideal amplitude intensity distribution shown in FIG. 5, in actuality, the amplitude intensity will be smaller as indicated by the solid line in this diagram. Likewise, with the lower diagram of FIG. 6, though the graph indicated by a broken line indicates the ideal light intensity distribution shown in FIG. 5, in actuality, the light intensity will be smaller as indicated by the solid line in this diagram.

Such lowering of the amplitude intensity of light transmitted through trench 210 is due to the existence of light L4 that proceed downwards from the side faces of trench 210 as shown in the upper diagram of FIG. 6. That is, since the light L4, which leak from the side faces of trench 210 are light that differ in phase from the light L2 that proceeds in the vertical direction from the upper side to the lower side of the diagram inside trench 210, the two types of light cancel each other out. As a result, the amplitude intensity of light L2 transmitted through aperture 112 is decreased. Meanwhile, for light L1 and L2 that are transmitted through apertures 111 and 113 in which a trench is not formed, the amplitude intensities do not decrease since such a canceling-out phenomenon does not occur.

Consequently, a circumstance arises wherein, in comparison to the intensity of light transmitted through an aperture with a phase setting of $\phi=0$ degree (an aperture in which a trench is not formed), the intensity of light transmitted through an aperture with a phase setting of $\phi=180$ degrees (an aperture in which a trench is formed) is decreased. This thus results in differences in the sizes of aperture patterns formed on the exposed surface despite performing exposure using a photomask with apertures of the same size.

In order to resolve such a problem, with a trench-type, Levenson-type (or Alternating Aperture type) phase shift mask, such a method is taken, wherein, for a pair of adjacently disposed apertures, a trench of a predetermined depth d is formed at the substrate part at which one of the apertures is formed so that the phase of the light transmitted through this one aperture will be shifted by 180 degrees with respect to the phase of the light transmitted through the other aperture and the outline of this trench is set to be greater than the outline of the aperture.

Figure 7:
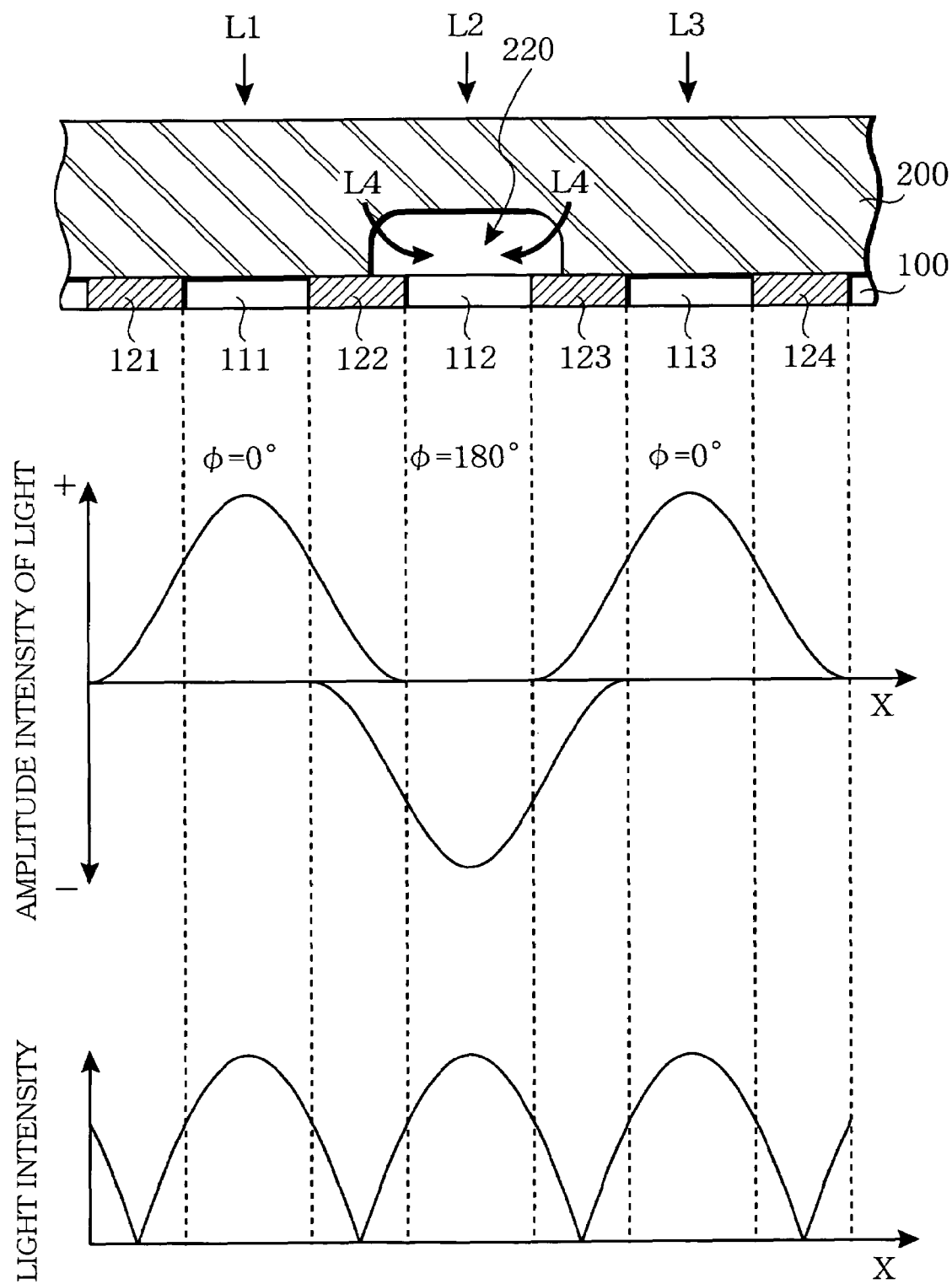
FIG. 7 shows diagrams that illustrate the real behavior of light transmitted through apertures of a trench-type, Levenson-type phase shift mask with the diffraction phenomenon taken into consideration, the upper diagram being a partially enlarged sectional side view of the phase shift mask, the middle diagram showing graphs of the amplitude intensity distributions of the light transmitted through this phase shift mask, and the lower diagram being a graph, showing the light intensity distribution of the light transmitted through this phase shift mask.

FIG. 7 shows diagrams that illustrate the real behavior of light transmitted through apertures of a trench-type, Levenson-type phase shift mask. The graphs of amplitude intensity distribution and light intensity distribution shown in the middle and lower diagrams, respectively, of FIG. 7 are the same as the ideal graphs shown in FIG. 5. This is due to the outline (outline on the XY plane) of trench 220 being set to be greater than the outline (outline on the XY plane) of aperture 112 as shown in the sectional side view of the upper diagram of FIG. 7. With such a structure, since the side faces of trench 220 will be retreated with respect to the outline portion of aperture 112, the light L4 that leak out from the side faces of trench 220 can be prevented from interfering with the light L2 that is transmitted through aperture 112.

Though with the Figures of the present application, specific graphs concerning light transmitted through a phase shift mask shall be indicated for the sake of convenience of description, the forms of these graphs will differ according to various condition settings. In general, the behavior of light transmitted through a phase shift mask will be affected by the design conditions (two-dimensional dimensions of the apertures, opaque parts, etc.), exposure condition (the values of exposure wavelength, numerical aperture, illumination, etc.), and three-dimensional structures, such as the undercut amount to be described later and the trench depth, etc. The graphs shown in the Figures of the present application illustrate results that are obtained when these various conditions are set to specific conditions.

<<<§ 2. Problem Concerning the Undercut Amount>>>

As was mentioned already in § 1, by use of a trench-type, Levenson-type phase shift mask with a three-dimensional structure such as that shown in the upper diagram of FIG. 7, the phases of transmitted light can be inverted for a pair of adjacently disposed apertures (the pair of apertures 111 and 112 or the pair of apertures 112 and 113 in the case of the illustrated example) and the influence of interference of the light L4 that leak out from the side from the side faces of the trench can be restrained. However, in actuality, in order to restrain the influence of interference of the light L4 completely, a predetermined value or more must be secured for the distance between the outline position of trench 220 and the outline position of the aperture.

Figure 8:
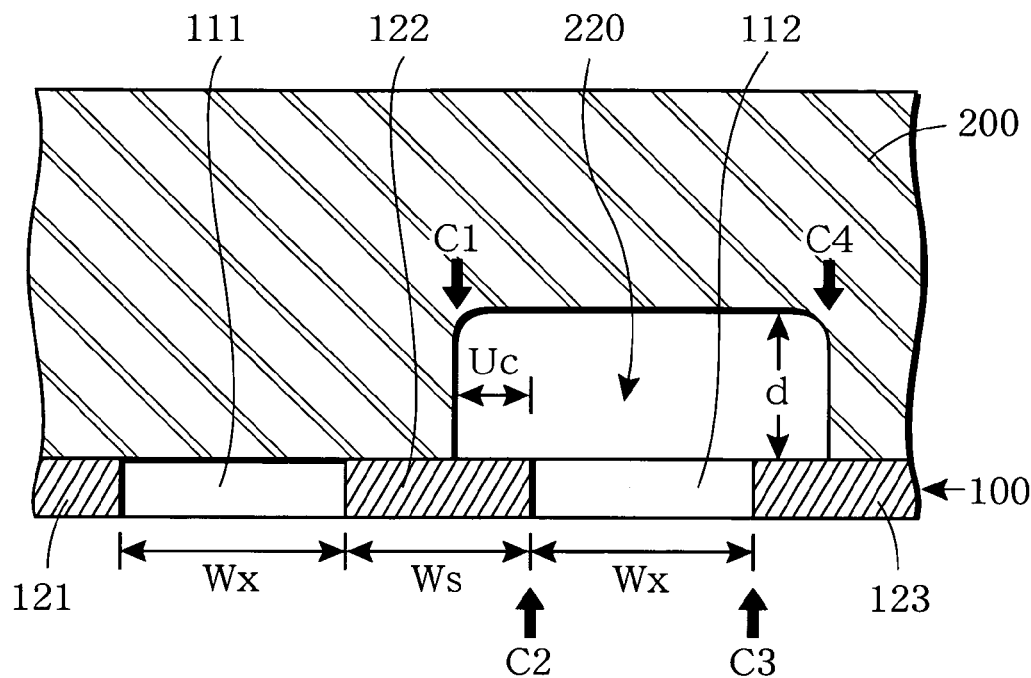
FIG. 8 shows a sectional side view (upper diagram), showing a part of the phase shift mask of the upper diagram of FIG. 7 in a further enlarged manner, and a graph (lower diagram), showing the intensity of the light transmitted through this phase shift mask.
Figure 8:
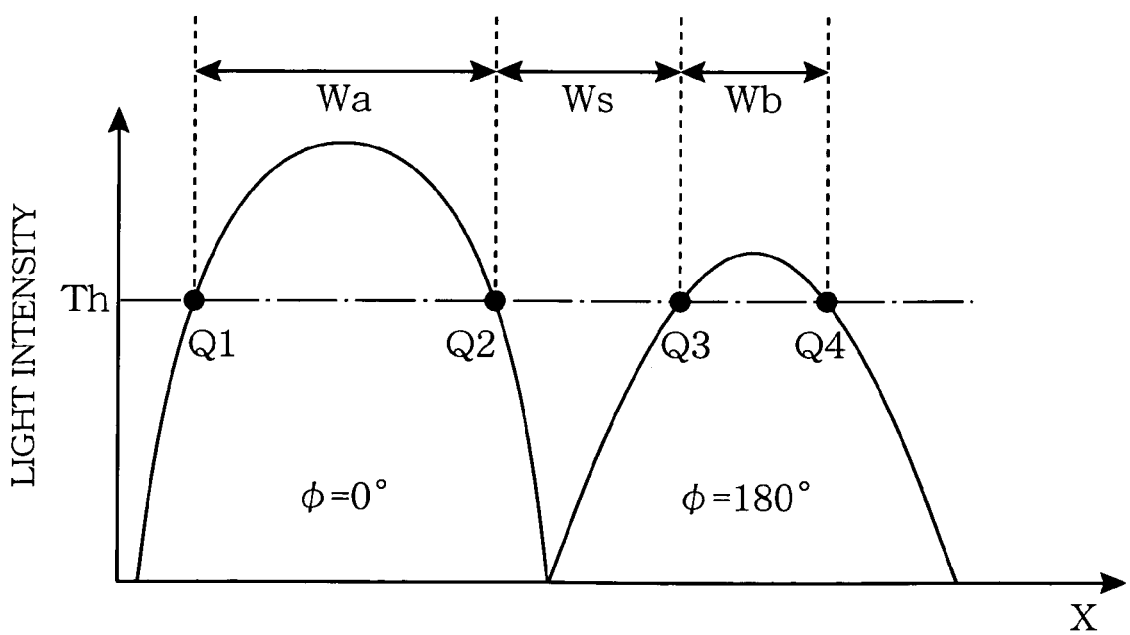

FIG. 8 shows a sectional side view (upper diagram), showing a part of the phase shift mask of the upper diagram of FIG. 7 in a further enlarged manner, and a graph (lower diagram), showing the intensity of the light transmitted through this phase shift mask. As shown in the upper diagram, a trench 220 of a predetermined depth d is formed in a substrate 220 and the outline of this trench 220 is set to be greater than the outline of aperture 112. That is, the position C1 of the outline of the left side (left side face) of trench 220 is retreated slightly to the left of the left-side outline position C2 of aperture 112 (right-end position of opaque part 122) and the position C4 of the outline of the right side (right side face) of trench 220 is retreated slightly to the right of the right-side outline position C3 of aperture 112 (left-end position of opaque part 123).

Here, the distance between the outline position of trench 220 and the outline position of aperture 112 shall be referred as the undercut amount Uc as shown in the Figure. Put in another way, this undercut amount Uc corresponds to being the width of the eaves portions of opaque parts 122 and 123 that are formed at the opening portions of trench 220. In terms of restraining the influence of interference of the light that leak out from the side faces of trench 220, the greater this undercut amount Uc, the more preferable. Actually, by setting the undercut amount Uc to at least a predetermined value, the influence of interference of the light L4 that leak out from the side faces of trench 220 can be restrained completely as in the example shown in FIG. 7, and the intensities of the light L1, L2, and L3 that are transmitted through the three apertures 111, 112, and 113 will be equal.

However, as the two-dimensional layout pattern that is formed on substrate 200 becomes finer, it becomes more difficult to secure an adequate undercut amount Uc. This is because as the layout pattern is made finer, the width Wx in the X-axis direction of apertures 111 and 112 and the width Ws in the X-axis direction of opaque parts 121, 122, and 123, shown in the upper diagram of FIG. 8, become smaller and thus the areas of contact between opaque parts 121, 122, and 123 and substrate 200 inevitably become smaller. As mentioned above, whereas substrate 200 is normally formed of a layer of transparent material, such as quartz glass, opaque layer 100 is formed of a layer of chromium or other metal material with an opaque property. Opaque layer 100 is thus more readily separated from substrate 200 the less the contact area between the two material layers.

Consequently, in order to manufacture a phase shift mask with adequate integrity for withstanding an actual exposure process to be performed on a semiconductor wafer, a contact area of a certain magnitude or more has to be secured between the two material layers. In other words, unless a contact dimension (Ws−Uc) of a certain magnitude or more is secured between opaque layer 122 and substrate 200 in the upper diagram of FIG. 8, opaque layer 122 may separate from substrate 200. It is thus inevitable that the undercut amount Uc that can actually be secured becomes smaller as the layout pattern becomes finer (as the width Ws of opaque layer 122 becomes smaller).

Actually, with a fine pattern with which the width Ws of opaque layer 122 is a few hundred nm's, it becomes difficult to secure an adequate undercut amount Uc. Obviously, the influence of interference of light leaking out from the side faces of trench 220 then becomes non-negligible and the intensity of light transmitted through trench 220 decreases. The graph of the lower diagram of FIG. 8 shows an example where the intensity of light transmitted through aperture 112 (light with a phase φ=180 degrees) is decreased in comparison to the light transmitted through aperture 111 (light with a phase φ=0 degree) due to the influence of such interference. Though the apertures 111 and 112 formed in opaque layer 100 are rectangular apertures of the same size of width Wx as shown in the upper diagram of FIG. 8, the intensities of the light transmitted through the respective apertures under a predetermined condition will differ as shown in the graph of the lower diagram of FIG. 8.

Here, the difference in the intensities of the light that are transmitted through such a pair of adjacently disposed apertures 111 and 112 shall be defined and handled quantitatively as a light intensity deviation. As long as the difference in the magnitudes of two light intensity distributions, such as those shown in the lower diagram of FIG. 8, can be indicated quantitatively, the light intensity deviation may be defined in any way. For example, the areas of the two graphs may be determined and the ratio or the difference of the areas may be defined as the light intensity deviation. Or, the peak values of the two graphs may be determined and the ratio or the difference of the values may be defined as the light intensity deviation.

Here, as shown in the lower diagram of FIG. 8, a predetermined threshold value Th is set for the light intensity, a level line (the line indicated by the alternate long and short dash line in the Figure) corresponding to this threshold value Th is drawn on the two-dimensional coordinate system, the intersections of this level line with the respective graphs are defined as Q1, Q2, Q3, and Q4, the distance Wa between the two points Q1 and Q2 and the distance Wb between the two points Q3 and Q4 are determined, and the difference, D=Wa−Wb is defined as the light intensity deviation D for the illustrated embodiment. In this case, since the value of light intensity deviation D will vary depending on how the threshold value Th is set, threshold value Th is set to a value such that the distance between the two points Q2 and Q3 will be equal to the width Ws of opaque part 122. In other words, when a graph such as that shown in the lower diagram of FIG. 8 is obtained, a level line that is parallel to the X-axis is defined so that the distance between the two points Q2 and Q3 will be equal to the width Ws of opaque part 122, the distance Wa and Wb are determined based on this level line, and the light intensity difference D is defined as the difference D=Wa−Wb.

By defining the light intensity deviation D by such a method, light intensity deviation D will be determined uniquely for a graph such as that shown in the lower diagram of FIG. 8. Though as mentioned above, the light intensity deviation may be defined in any way in putting this invention into practice as long as it can quantitatively indicate the difference between the transmitted light intensity for phase φ=0 degree and the transmitted light intensity for phase φ=180 degrees, the use of the light intensity deviation D defined as the difference D=Wa−Wb as indicated in the present embodiment is extremely practical. This is because, when the light intensity deviation is defined by a method of comparing the areas of the graphs, there is the demerit that the computing load for determining the areas becomes large, and when the light intensity deviation is defined by a method of comparing the peak values of the graphs, there is the demerit that the precision of comparison will be low. The light intensity deviation D that is defined as the difference D=Wa−Wb employs a method of comparing the widths of the graphs at a predetermined level position and is thus low in computing load and also provides the merit of enabling the securing of certain level of precision of comparison. Such a light intensity deviation D that is defined as the difference D=Wa−Wb is, in general, referred to as a "Walking Distance".

Consequently, when due to the layout pattern becoming fine, an adequate undercut amount Uc cannot be secured, a light intensity deviation D will arise for the light transmitted through a pair of adjacent apertures 111 and 112 as shown in the lower diagram of FIG. 8, even with a trench-type, Levenson-type phase shift mask, such as that shown in the upper diagram of FIG. 8.

In order to prevent such a light intensity deviation D from occurring in the exposure of a semiconductor wafer, dimensional corrections considering the occurrence of light intensity deviation D in advance are applied to the two-dimensional layout pattern formed on the phase shift mask. Specifically, in the case of the example illustrated in FIG. 8, corrections must be applied to the sizes of apertures 111 and 112.

For example, with the example shown in FIG. 8, the light intensity deviation D arises as a result of aperture 111, for which the phase of transmitted light is such that φ=0 degree (in other words, the aperture with which a trench is not formed), and aperture 112, for which the phase of transmitted light is such that φ=180 degrees (in other words, the aperture with which a trench is formed), being set to the same width Wx. By performing a correction by which the width Wx of aperture 111 is slightly narrowed and performing a correction by which the width Wx of aperture 112 is slightly widened, the intensity of light transmitted through aperture 111 can be decreased and the intensity of light transmitted through aperture 112 can be increased. The light intensity deviation D can thus be made zero if the correction amounts of the widths can be set appropriately.

However, as a realistic problem, a vast amount of labor and time is required for determining optimal correction amounts for making the light intensity deviation D zero. This is because, as shown in the sectional side view of the upper diagram of FIG. 8, with a trench-type, Levenson-type phase shift mask in which a trench is formed in substrate 200, the part at which trench 220 is formed takes on a three-dimensional structure, making two-dimensional analysis inadequate and necessitating the performing of a three-dimensional analysis. For example, with the illustrated example, though the intensity of light transmitted through aperture 112 will obviously increase if the width Wx of aperture 112 is widened by a small amount, how much the light intensity will increase cannot be known unless a photomask of the exact design dimensions is actually manufactured and experimented with or a three-dimensional simulation using a computer is executed. Thus in designing a single phase shift mask, a vast amount of labor and time will be consumed in determining an optimal correction amount for making the light intensity deviation D zero by trial and error.

An object of this invention is to provide a designing method and device for phase shift mask that will enable such a work load to be lightened and the working time to be shortened. The basic principles of the designing method of this invention shall now be described.

§ 3. Basic Principle of Designing Method of Invention

The inventor of the present application recognized that in a case of performing three-dimensional analysis to determine the light intensity deviation D for a three-dimensional structure, such as that shown in the upper diagram of FIG. 8, the respective parameters to be described below are involved. Consider a case where a two-dimensional layout pattern such as that shown in FIG. 9 (the same pattern as that shown in FIG. 1) is formed on opaque layer 100 itself. In this example, rectangular apertures 110 of the same size are formed at five locations and frame-shaped opaque parts 120 surround these apertures 110. Here, a setting for performing a phase shift (a setting by which φ=180 degrees) is applied to every other aperture of the respective apertures 110 that are aligned in the X-axis direction, and a trench 220 is formed at the region of each aperture that has been subject to this setting.

If for this two-dimensional layout pattern, a two-dimensional, XY coordinate system is defined as illustrated, the width in the X-axis direction and the width in the Y-axis direction of each aperture 110 are defined as Wx and Wy, respectively, and the width in the X-axis direction of each opaque part 120 is defined as Ws, all of these dimension values Wx, Wy, and Ws will be parameters that affect the value of light intensity deviation D. Needless to say, the undercut amount Uc, shown in the upper diagram of FIG. 8, will also be a parameter that affects the value of light intensity deviation D. The inventor of this application considers that, in performing three-dimensional analysis of the behavior of light from an exposure tool for a trench-type, Levenson-type phase shift mask, these four parameters Wx, Wy, Ws, and Uc are the major parameters that determine the value of light intensity deviation D.

As mentioned above, the behavior of light transmitted through a phase shift mask is affected by the design conditions (two-dimensional dimensions of the apertures, opaque parts, etc.), exposure condition (the values of exposure wavelength, numerical aperture, illumination, etc.), and three-dimensional structures, such as the undercut amount, trench depth, etc. However, the exposure condition is a condition determined by the exposure tool used in the process of forming a pattern on a semiconductor wafer and is not a condition that can be set freely in designing a phase shift mask. Also, though the depth d of trench 220 may be a parameter that defines the three-dimensional structure, this depth d must be set to a length that is necessary for shifting the phase of transmitted light by 180 degrees. The depth d is thus an amount that is determined by the wavelength of the light source of the exposure tool used and is thus not a parameter that can be set as suited. Thus if it is premised that a specific exposure tool is used to execute a pattern forming process on a semiconductor wafer, the predetermined exposure condition is already determined, the value of the depth d of the trench is uniquely determined, and consequently, the parameters that are variable in the designing step of a phase shift mask are the parameters, Wx, Wy, and Ws and the undercut amount Uc that correspond to being a designing condition.

As shall be described later, with the present invention, a three-dimensional analysis and a two-dimensional analysis for tracing the behavior of light transmitted through a phase shift mask are performed by conducting a three-dimensional simulation and a two-dimensional simulation. Since these analyses are all premised on executing a pattern forming process onto a semiconductor wafer using a specific exposure tool, a condition that is unique to the specific exposure tool is set in regard to the exposure condition.

The inventor of this application carried out three-dimensional simulations of cases of varying the combinations of the values of the abovementioned four parameters Wx, Wy, Ws, and Uc in various ways for a three-dimensional structure, such as that shown in the upper diagram of FIG. 8 and determined the light intensity deviation D for each case. As mentioned above, with regard to the exposure condition, a condition that is unique to a specific exposure tool was set.

Figure 10:
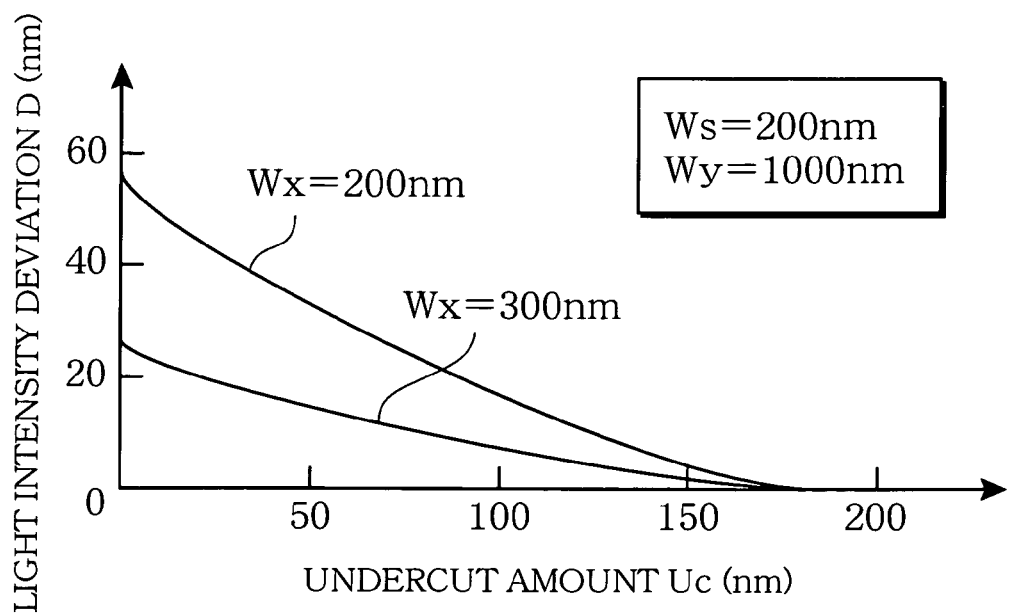
FIG. 10 shows graphs of the relationship between the undercut amount Uc (unit: nm) and the light intensity deviation D (unit: nm) when, in the three-dimensional structure shown in the upper diagram of FIG. 8, the width Ws in the X-axis direction of an opaque part 122 is set equal to 200 nm, the width Wy in the Y-axis direction (in FIG. 8, the width in the direction perpendicular to the paper surface) of each of apertures 111 and 112 is set equal to 1000 nm, and the width Wx in the X-axis direction of each of apertures 111 and 112 is set equal to the two values of 200 nm and 300 nm.

For example, the graphs of FIG. 10 are graphs of the relationship between the undercut amount Uc (unit: nm) and the light intensity deviation D (unit: nm) when, in the three-dimensional structure shown in the upper diagram of FIG. 8, the width Ws in the X-axis direction of an opaque part 122 is set equal to 200 nm, the width Wy in the Y-axis direction (in FIG. 8, the width in the direction perpendicular to the paper surface) of each of apertures 111 and 112 is set equal to 100 nm, and the width Wx in the X-axis direction of each of apertures 111 and 112 is set equal to the two values of 200 nm and 300 nm. The light intensity deviation D is the greatest when the undercut amount Uc is 0 (corresponding to the structure shown in the upper diagram of FIG. 5), and the light intensity deviation D decreases as the undercut amount Uc is made larger. And when the undercut amount Uc becomes equal to or greater than a predetermined length, the light intensity deviation D becomes zero. In the illustrated example, the light intensity deviation D can be restrained to zero when the undercut amount Uc exceeds 180 nm. It can also be seen that even if the undercut amount Uc is the same, the light intensity deviation D is smaller in the case where the width Wx in the X-axis direction of an aperture is 300 nm than in the case where the width Wx is 200 nm.

Though the graphs of FIG. 10 are graphs with which Ws and Wy are fixed at Ws=200 nm and Wy=1000 nm, if various combinations are made for Ws and Wy, similar graphs will be obtained for the respective combinations. Though needless to say predetermined exposure condition must be set to perform such three-dimensional simulations, in regard to parameters concerning the structure of a phase shift mask, the value of the light intensity deviation D can be determined if the abovementioned four parameters Wx, Wy, Ws, and Uc (and trench depth d) are determined.

With the example illustrated in the graphs of FIG. 10, the light intensity deviation D can be restricted to zero if the undercut amount Uc is set so that Uc=180 nm or more, and ideal light transmission characteristics, such as those shown in FIG. 7, can thereby be obtained. However, as was mentioned already, as the layout pattern becomes finer, the need to restrain the separation of the opaque layer makes it more difficult to secure an adequate undercut amount Uc. This invention proposes a new method for performing layout designing by which the light intensity deviation D is made closer to zero under designing conditions in which such an adequate undercut amount Uc cannot be secured. Put in another way, this invention provides a method of making the light intensity deviation D closer to zero by applying predetermined corrections to a layout pattern with which the undercut amount Uc is within a range of less than 180 nm in the graph shown in FIG. 10.

The correction according to the present invention is a two-dimensional correction performed on the two-dimensional layout pattern, and it is premised that no correction is applied to depth d of trench 220 of the three-dimensional structure in the upper diagram of FIG. 8 and no correction is applied to undercut amount Uc. Such a premise is actually obvious in consideration of the object of this invention. That is, since depth d of trench 220 is uniquely determined by the light source wavelength of the exposure tool, it cannot be changed arbitrarily for the reason of "making the light intensity deviation D zero". With regard to the undercut amount Uc, the maximum value thereof is determined automatically by the need to satisfy the physical requirement of preventing the separation of the opaque layer. As is clear from the upper diagram of FIG. 8, as the undercut amount Uc becomes greater, the adjacent dimension of opaque part 122 with respect to substrate 200 becomes smaller and separation becomes more frequent. For practical purposes, the maximum value of the undercut amount Uc having some degree of manufacturing tolerance must be set in adequate consideration of the yield of manufacture of a phase shift mask. Thus the undercut amount Uc cannot be set to a large value arbitrarily for the reason of "making the light intensity deviation D zero".

Thus, in the present invention, the trench depth d and the undercut amount Uc are determined with the first priority, and the light intensity deviation D should be approximated to zero with maintaining the values of d and Uc.

Figure 11:
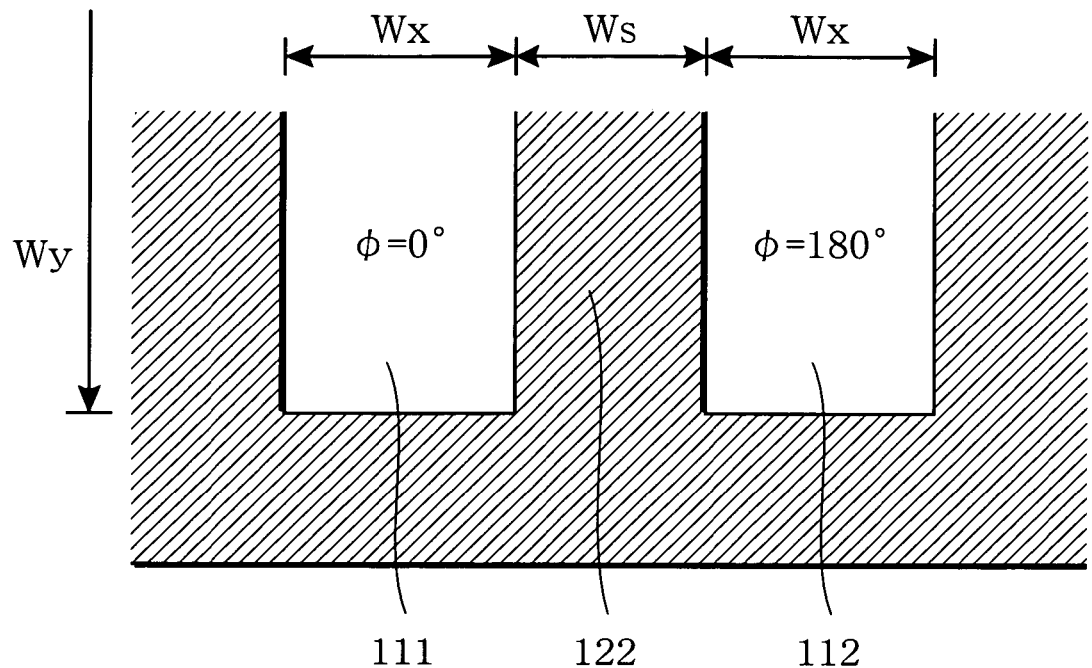
FIG. 11 is a plan view, showing an example of a two-dimensional layout pattern having a pair of apertures 111 and 112 of the same size (the hatching indicates opaque parts and not cross sections).

Suppose now that a designer of a photomask makes a design in which rectangular apertures 111 and 112 of the same size, such as shown in FIG. 11, are disposed on a two-dimensional layout pattern. As mentioned above, since the pair of apertures 111 and 112 are disposed adjacently, if the phase of the light transmitted through one aperture 111 is such that $\phi=0$ degree, measures must be taken to make the phase of the light transmitted through the other aperture 112 such that $\phi=180$ degrees in order to cancel out the influence of light that diffracts into the region of opaque part 122 by the diffraction phenomenon. Specifically, a trench 220 must be formed in the substrate for aperture 112 to set the phase $\phi=180$ degrees as was mentioned above as well.

Here, the pair of apertures 111 and 112 are rectangular open patterns of the same size and are equal in both the width Wx in the X-axis direction and the width Wy in the Y-axis direction. The designer of the photomask positioned such rectangular apertures 111 and 112 of the same size intending to make a photomask that can form rectangular exposure patterns of the same size on the exposed surface of a semiconductor wafer. However, as mentioned above, unless an adequate undercut amount Uc can be secured, the transmitted light intensity of aperture 112 will be lower in comparison to the transmitted light intensity of aperture 111 and it will not be possible to form rectangular exposure patterns of the same size on the exposed surface of a semiconductor wafer as the designer intended.

Figure 12:
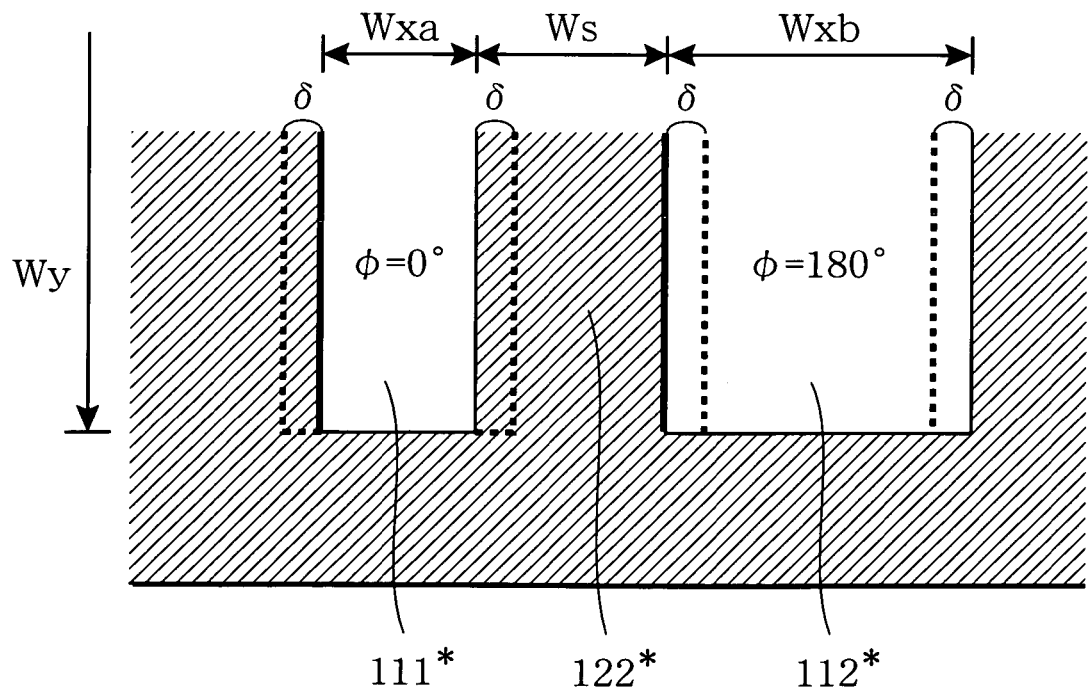
FIG. 12 is a plan view, showing a pattern obtained by applying correction to the two-dimensional layout pattern shown in FIG. 11 (the hatching indicates opaque parts and not cross sections).

Suppose that corrections are thus applied to the two-dimensional layout pattern shown in FIG. 11 and a pattern such as that shown in FIG. 12 is obtained. With this correction, the width Wx in the X-axis direction is changed with each of apertures 111 and 112. That is, aperture 111, for which $\phi=0$ degree, is narrowed in width by just $\delta$ at both the left and right sides and changed to an aperture 111\* and aperture 112, for which $\phi=180$ degrees, is broadened in width by just $\delta$ at both the left and right sides and changed to an aperture 112\*. Each aperture is not changed in regard to the width Wy in the Y-axis direction. Consequently, the width Wxa in the X-axis direction of aperture 111\* after the change is made smaller than the width Wx prior to the change by just $2\delta$, and the width Wxb in the X-axis direction of aperture 112\* after the change is made larger than the width Wx prior to the change by just $2\delta$. As a result, the total amount of light transmitted through aperture 111\* decreases and the total amount of light transmitted through aperture 112\* increases.

Here, as the correction amount $\delta$ is increased gradually from 0, the difference in the sizes of the pair of graphs (the graph for $\phi=0$ degree and the graph for $\phi=180$ degrees) shown in the lower diagram of FIG. 8 decreases gradually. Thus by setting the correction amount $\delta$ to an appropriate amount, the pair of graphs can be made equal in size and rectangular exposure patterns of the same size can be formed on the exposed surface of a semiconductor wafer. This is the basic principle of the correction that is carried out in this invention.

That is, with this invention, when a two-dimensional layout pattern such as that shown in FIG. 11 is designed by a designer, the corrections of narrowing the width of an aperture with which a phase shift is not performed (an aperture for which $\phi=0$ degree) and widening the width of an aperture with which a phase shift is performed (an aperture for which $\phi=180$ degrees) are made to cancel out the decrease of light intensity that occurs, due to the existence of a trench, at just the aperture with which a phase shift is performed. With the pattern after correction, shown in FIG. 12, though the two apertures 111\* and 112\* have different widths Wxa and Wxb, when exposure is actually performed using the phase shift mask, rectangular exposure patterns of the same size can be formed on the exposed surface of a semiconductor wafer.

In correcting the widths of the respective apertures, corrections are preferably made so that the center positions of the respective positions will always be fixed. For example, the center positions in the X-axis direction of the apertures 111 and 112 shown in FIG. 11 match the center positions in the X-axis direction of the apertures 111\* and 112\* shown in FIG. 12. Put in another way, aperture 111\* is obtained by applying a correction that narrows the width of aperture 111 uniformly from both sides, and aperture 112\* is obtained by applying a correction that widens the width of aperture 112 uniformly at both sides. As a result, the width Ws of opaque part 122\* after correction will be matched with the width Ws of opaque part 122 prior to correction (the position will be shifted slightly) and there will thus be no changes in the width of the opaque part.

With regard to the pitch of apertures, whereas a pitch P in the case of the pattern shown in FIG. 11 is such that "P=Wx+Ws", a pitch P\* in the case of the pattern after correction that is shown in FIG. 12 will be "P\*=Wxa+Ws (in the case of an odd number pitch)" or "P\*=Wxb+Ws (in the case of an even number pitch)", and thus an odd number pitch will be narrow and an even number pitch will be wide. However, the sum of an odd number pitch and an even number pitch will not differ before and after the corrections. That is, with regard to the plan view shown in FIG. 9, though some changes will be made in terms of pitch P by the corrections, no changes will be made in terms of pitch 2P by the corrections. The change of the layout pitch of the apertures that results from the above-described correction therefore will not give rise to a major problem in terms of practical use.

Thus in principle, by correcting the layout pattern shown in FIG. 11 to the layout pattern shown in FIG. 12, a phase shift mask, by which a designer's intended exposure pattern can be obtained, can be realized even if the undercut amount Uc is inadequate. However in actuality, there remains the problem of how to determine an appropriate correction amount $\delta$. The reason for this is that, as was mentioned above, with a trench-type, Levenson-type phase shift mask, with which a trench is formed in substrate 200, the part at which trench 220 is formed takes on a three-dimensional structure, thus making two-dimensional analysis inadequate and making three-dimensional analysis necessary. As mentioned above, though this three-dimensional analysis can be executed by a method of determining the four parameters Wx, Wy, Ws, and Uc and determining the value of the light intensity deviation D, a vast amount of labor and time are required to determine, by trial and error, an optimal correction amount δ that makes the light intensity deviation D zero.

The most characteristic point that this invention makes note of is to apply two-dimensional analysis in place of three-dimensional analysis in the determination of the correction amount d. As mentioned above, the root cause of occurrence of the light intensity deviation D lies in the three-dimensional structure in which a trench is formed in one of the apertures. Thus primarily, three-dimensional analysis must be performed as the analysis for determining the light intensity deviation D. There is no way for the concept of a three-dimensional trench to fall under the scope of two-dimensional analysis, and it thus seems at first sight that the phenomenon that gives rise to the light intensity deviation D cannot be handled by the two-dimensional analysis. However, the inventor of the present application found that by introducing the virtual parameter of "transmittance", the three-dimensional phenomenon that gives rise to the light intensity deviation D can be handled by replacement by a two-dimensional model. The characteristic of the method and device for designing a phase shift mask of the present invention lies in this change of way of thinking.

Figure 13:
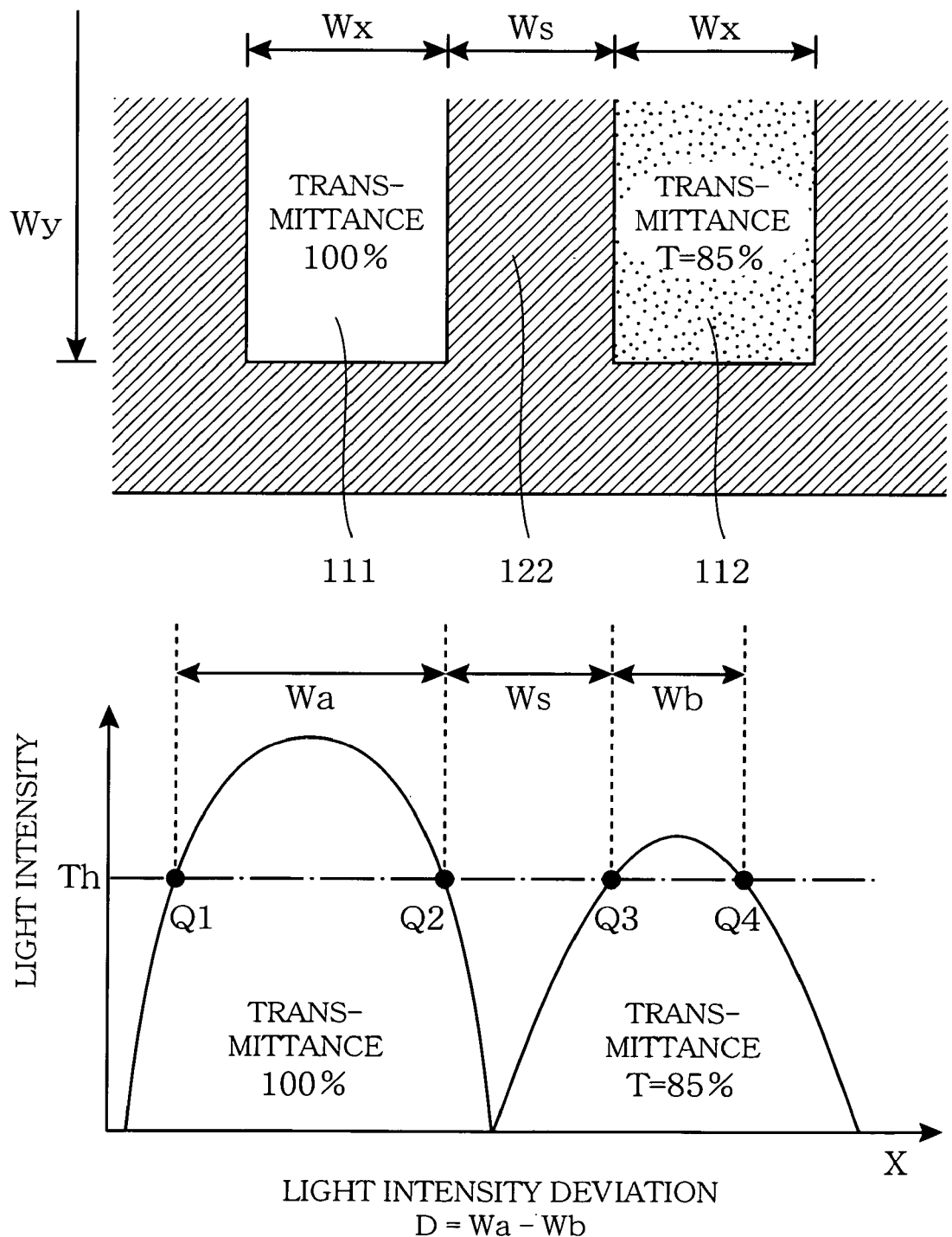
FIG. 13 shows a plan view (upper diagram) of a two-dimensional model of an example of a phase shift mask with a pair of apertures 111 and 112 of the same size and a graph (lower diagram) of the intensity of the light transmitted through this phase shift mask (the hatching indicates opaque parts and semitransparent parts and not cross sections).

Here, consider a two-dimensional model, such as that shown in the upper diagram of FIG. 13. This model illustrates a two-dimensional layout pattern with a pair of apertures 111 and 112 of the same size (Wx×Wy). Though the pattern of each aperture is exactly the same as that shown in the plan view of FIG. 11, whereas the plan view of FIG. 11 shows the planar pattern of opaque layer 100 of a phase shift mask with a three-dimensional structure (structure with a trench), the plan view of the upper diagram of FIG. 13 illustrates the planar pattern of a virtual two-dimensional phase shift mask without thickness.

Here, suppose that a transmittance of 100% is set for aperture 111 at the left side of the diagram and a transmittance T of 85% is set for aperture 112 at the right side of the diagram. If two-dimensional analysis under predetermined exposure conditions is then performed with the assumption that the width Wx in the X-axis direction of each of the apertures 111 and 112 and the width Ws in the X-axis direction of an opaque part 122 take on values close to the wavelength of light (that is, if analysis is performed with the premise that light diffracts to the lower surface of opaque part 122 due to the diffraction phenomenon), a light intensity graph, such as shown in the lower diagram of FIG. 13 can be obtained. In the field of photomask designing, such two-dimensional analysis method itself is a known art and the setting of a predetermined transmittance for each aperture is already practiced.

The graphs of the lower diagram of FIG. 13 and the graphs of the lower diagram of FIG. 8 share the feature of being graphs of intensity distributions of light transmitted through a pair of adjacently disposed apertures 111 and 112. In both cases, a light intensity deviation D of a certain value can be determined by setting a level line, which is parallel to the X-axis and is such that the distance between the two points Q2 and Q3 will be equal to the width Ws of opaque part 122, determining the distance Wa and Wb based on this level line, and determining the light intensity deviation D as the deviation D=Wa−Wb.

Needless to say, the result shown in the lower diagram of FIG. 8 is obtained by three-dimensional analysis using the three-dimensional structure shown in the upper diagram of FIG. 8 as a model, and the occurrence of the light intensity deviation D is caused by a trench not being formed at the aperture 111 side while there being a trench 220 formed at the aperture 112 side. On the other hand, the result shown in the lower diagram of FIG. 13 is obtained by a two-dimensional analysis using the virtual two-dimensional model shown in the upper diagram of FIG. 13, and the light intensity deviation D is caused by the transmittance of the aperture 111 side being set to 100% while the transmittance T of the aperture 112 side being set equal to 85%. The primary cause by which the light intensity deviation D occurs differs completely between the three-dimensional analysis illustrated in FIG. 8 and the two-dimensional analysis illustrated in FIG. 13. However, the phenomenon that the light intensity deviation D occurs for light transmitted through a pair of apertures in a case where a pair of apertures 111 and 112, each with widths Wx and Wy, are adjacently disposed across opaque part 122, with a width of Ws, is equivalent to both.

The inventor of the present application thus noted that by replacing the three-dimensional model, which is shown in FIG. 8 and is subject to three-dimensional analysis, by the two-dimensional model, shown in FIG. 13, and determining an appropriate correction amount δ using a two-dimensional analysis method, the total work load can be lightened and the working time can be shortened.

Figure 14:
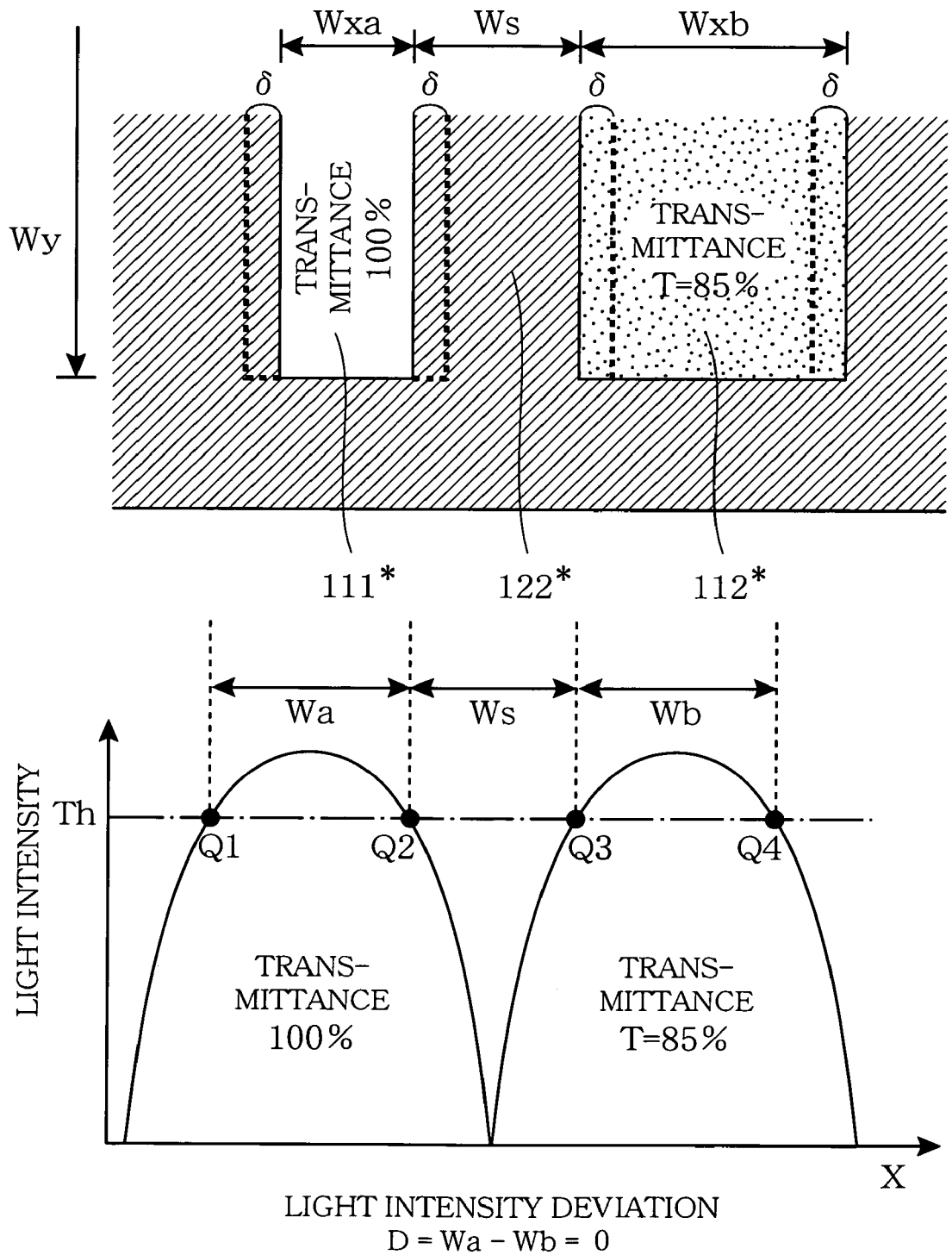
FIG. 14 shows a plan view (upper diagram) of a two-dimensional model of a phase shift mask which is obtained by making a correction to the phase shift mask shown in FIG. 13 and a graph (lower diagram) of the intensity of the light transmitted through this phase shift mask (the hatching indicates opaque parts and semitransparent parts and not cross sections).

In order to make the light intensity deviation D, which occurs in the two-dimensional model shown in FIG. 13, zero, a correction, such as that shown in the upper diagram of FIG. 14, may be performed. The correction itself is exactly the same as the correction illustrated in FIG. 12 and the widths Wx in the X-axis direction of the respective apertures 111 and 112 are changed. That is, aperture 111 with a transmittance of 100% is changed to an aperture 111* with which the width has been narrowed by just δ from both the left and right sides, and aperture 112 with a transmittance T=85% is changed to an aperture 112* with which the width has been widened by just δ at both the left and right sides. With each aperture, there is no change of the width Wy in the Y-axis direction. Consequently, the width Wxa in the X-axis direction of aperture 111* after the change is reduced by just 2 δ in comparison to the width Wx prior to the change, and the width Wxb in the X-axis direction of aperture 112* after the change is enlarged by just 2 δ in comparison to the width Wx prior to the change. As a result, the total amount of light transmitted through aperture 111* is reduced and the total amount of light transmitted through aperture 112* is increased.

Thus even with the above-described two-dimensional model, if the correction amount δ can be set to an appropriate value, the size of the graph that indicates the intensity distribution of light transmitted through aperture 111* can be made equal to the size of the graph that indicates the intensity distribution of light transmitted through aperture 112* as shown in the lower diagram of FIG. 14, thereby making the light intensity deviation D zero and enabling rectangular exposure patterns of the same size to be obtained on the exposed surface of a semiconductor surface. As mentioned above, in correcting the width of each aperture, it is preferable to perform a correction with which the central position of each aperture will be a fixed position at all times.

As mentioned above, in determining the light intensity deviation D by a three-dimensional analysis method using a three-dimensional model, such as that shown in the upper diagram of FIG. 8, the four parameters Wx, Wy, Ws, and Uc must be determined. Meanwhile, in determining the light intensity deviation D by a two-dimensional analysis method using a two-dimensional model, such as that shown in the upper diagram of FIG. 13, the four parameters Wx, Wy, Ws, and T must be determined. A comparison of the parameters that are necessary in the two cases shows that whereas the parameters Wx, Wy, and Ws (these are all parameters that indicate dimensions of a two-dimensional layout pattern) are used in common in both cases, the cases differ in that the undercut amount Uc is needed as the fourth parameter for three-dimensional analysis and the transmittance T is needed as the fourth parameter for two-dimensional analysis. This is because whereas with the three-dimensional model, the undercut amount Uc is an important parameter that affects the light intensity deviation D, with the two-dimensional model, the transmittance T is introduced as a parameter in place of the undercut amount Uc since there is no such concept as the undercut amount Uc to start with in the two-dimensional model.

Since, under predetermined exposure conditions, the light intensity deviation D can be determined by determining the four parameters of Wx, Wy, Ws, and Uc in the case of three-dimensional analysis and the light intensity deviation D can be determined by determining the four parameters of Wx, Wy, Ws, and T in the case of two-dimensional analysis, it may seem that there will not be much difference in using one or the other analysis method. However, three-dimensional analysis requires a vast amount of labor and time in comparison to two-dimensional analysis.

For example, if typical parameter values are provided and the respective analysis methods are executed by computer simulation using a general personal computer, whereas a computation time in the order of minutes is required to determine the light intensity deviation D by three-dimensional analysis, a computation time of merely in the order of msec is required to determine the light intensity deviation D by two-dimensional analysis. The replacement of three-dimensional analysis by two-dimensional analysis is thus extremely significant for practical use. A key point of this invention is that by replacing the three-dimensional model, which is shown in FIG. 8 and is subject to three-dimensional analysis, by the two-dimensional model shown in FIG. 13 and using a two-dimensional analysis method to determine an appropriate correction amount δ, the total work load is lightened and the working time is shortened. Specific procedures for this method shall now be described in § 4.

<<<§ 4. Specific Method and Device for Designing Phase Shift Mask of the Invention>>>

Figure 15:
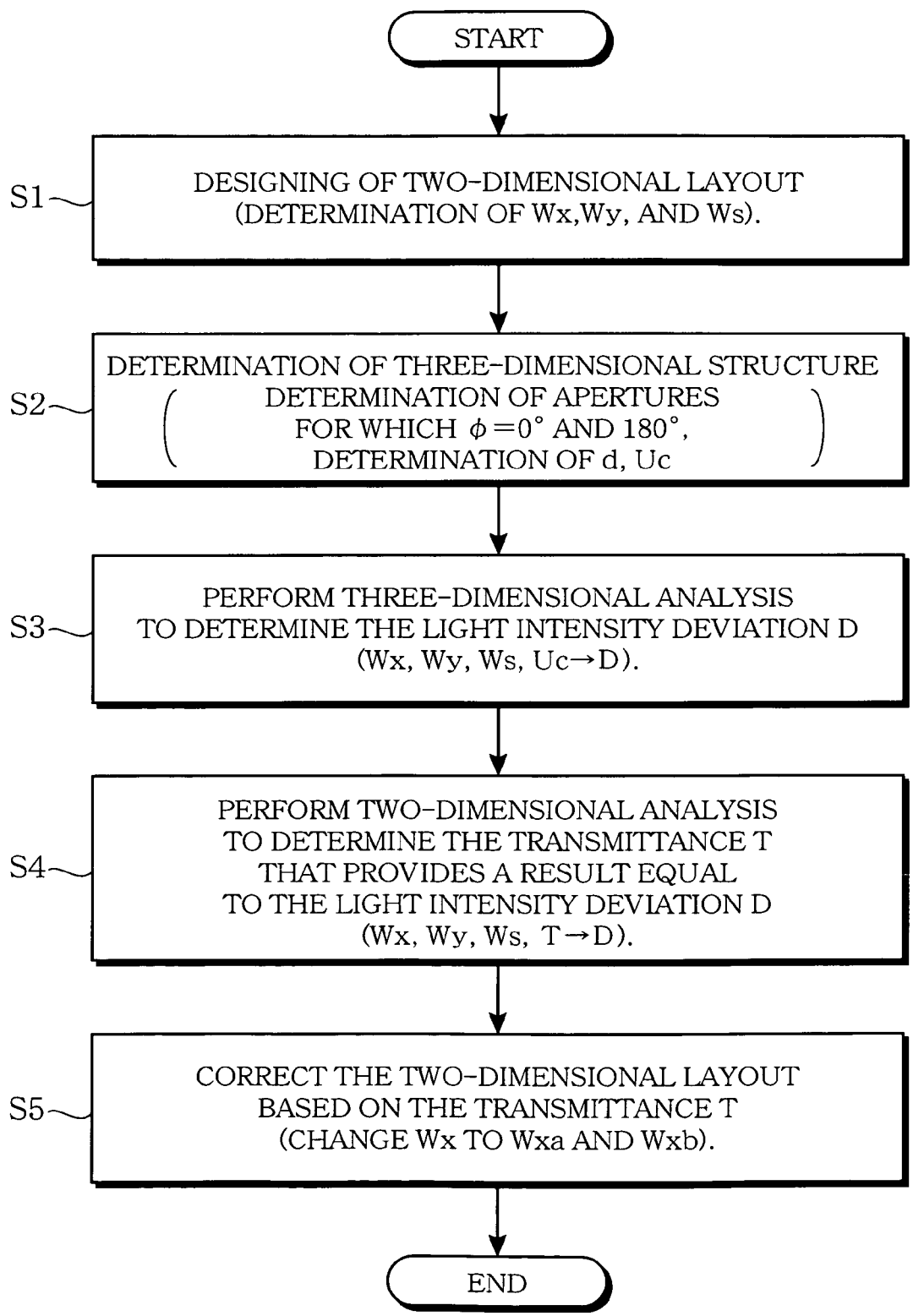
FIG. 15 is a flowchart, showing procedures of a phase shift mask designing method of a basic embodiment of this invention.

FIG. 15 is a flowchart, showing the procedures of a phase shift mask designing method of a basic embodiment of this invention. First in step S1, designing of the two-dimensional layout of the phase mask to be designed is performed. This is a task of designing a two-dimensional layout pattern, such as that shown in the plan view of FIG. 9, and is normally a task performed using a dedicated design tool on a computer. In this task, an XY plane is defined on the surface of a substrate on which a phase shift mask is to be formed and a plurality of apertures of the same size are positioned at least along the X-axis.

Figure 9:
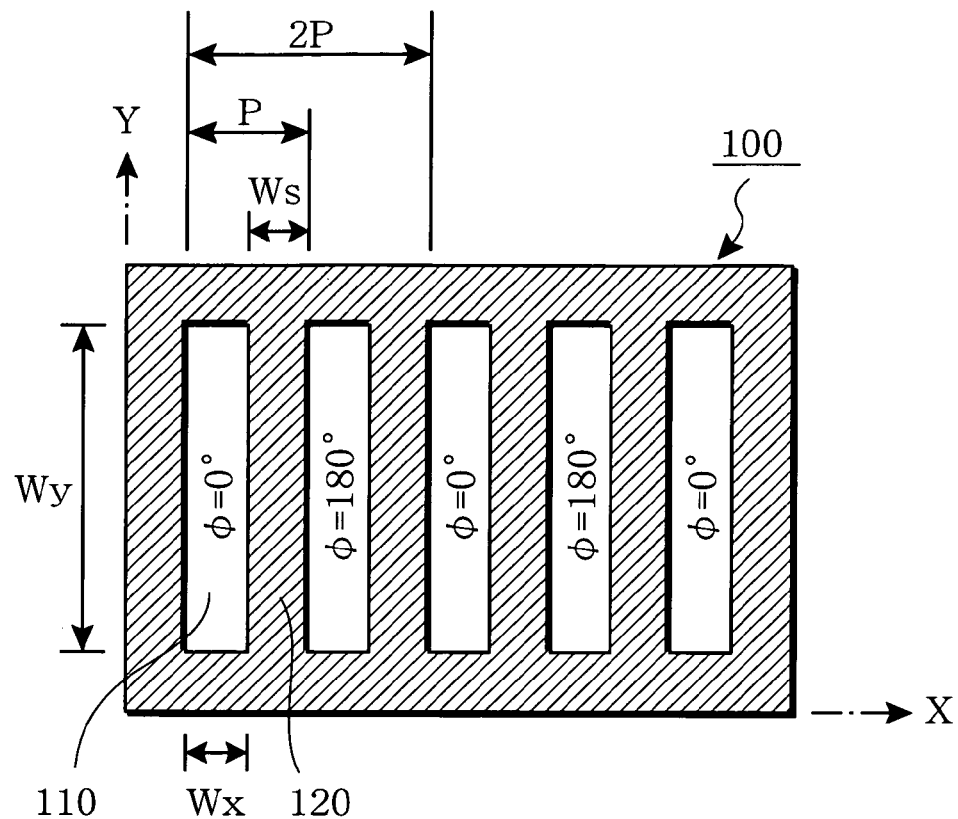
FIG. 9 is a plan view, showing the dimensions of the respective parts of the two-dimensional layout pattern shown in FIG. 1 (the hatching indicates opaque parts and not cross sections).

Though FIG. 9 shows an example wherein five apertures are positioned, in actuality, a larger number of apertures of the same size are positioned at a fixed pitch in the X-axis direction to form a "line and space pattern." Needless to say, in putting this invention to practice, it is sufficient that a two-dimensional layout pattern with at least two apertures can be defined. Specifically in this task of step S1, the width Wx in the X-axis direction and the width Wy in the Y-axis direction of each aperture and the width Ws of each opaque part must be determined.

Next in step S2, the three-dimensional structure of the phase mask that is to be designed is determined. Here, as a first matter that must be determined, whether or not phase shifting is to be performed must be determined for each of the plurality of apertures included in the layout pattern designed in step S1. In a case where a plurality of apertures are positioned in the X-axis direction as shown in FIG. 9, the phase is to be shifted at every other aperture in accordance to the order of alignment. In the case of the example of FIG. 9, the "determination that phase shifting is not to be performed (the determination of setting f=0 degree)" is made for the first, third, and fifth apertures and the "determination that phase shifting is to be performed (the determination of setting f=180 degrees)" is made for the second and fourth apertures.

The second matter that must be determined in the step S2 is the specific three-dimensional structure of a trench to be dug in the substrate at the position of each aperture for which the "determination that phase shifting is to be performed (the determination of setting f=180 degrees)" has been made. That is, the depth d and the undercut amount Uc of the trench 220, shown in the upper diagram of FIG. 8, are determined. Here, the depth d of the trench is determined as the length necessary for shifting the phase of the light source wavelength of the exposure tool by just 180 degrees. Meanwhile, as the undercut amount Uc, an adequately large amount is determined while securing an adequate allowance in terms of the manufacturing process such that, in consideration of the width Ws of opaque part 122, etc., opaque part 122 will not become removed from an actual phase shift mask. The undercut amount Uc that is determined here will not be corrected in subsequent steps and thus becomes the final undercut amount Uc that is determined in the designing method of the present invention.

Next in step S3, three-dimensional analysis is performed based on the design data at the present point in time to determine the light intensity deviation D. That is, since a specific three-dimensional structural body is defined by the two-dimensional layout designed in step S1 (for example, the pattern of FIG. 9) and the three-dimensional structure determined in step S2 (for example, the structure of trench 220 shown in the upper diagram of FIG. 8), three-dimensional analysis is performed using this specific three-dimensional structural body as a three-dimensional model. Specifically, the task of providing the four parameters Wx, Wy, Ws, and Uc, the predetermined exposure conditions, and the trench depth d to a three-dimensional simulator using a computer, carrying out a simulation concerning the behavior of transmitted light in a case where light is transmitted under the same conditions through a pair of adjacent apertures designed to realize a phase shift of 180 degrees with respect to each other, determining a graph, such as that shown in the lower diagram of FIG. 8, by computation, and determining the light intensity deviation D that indicates the deviation of the intensities of the light transmitted through the respective apertures is performed.

As mentioned above, with the present embodiment, the light intensity deviation is defined as D=Wa−Wb, that is, the difference in the transverse width of graphs. Though such a three-dimensional simulation actually requires a long computation time, in step S3, a computation, of determining the light intensity deviation D when a single set of parameter values Wx, Wy, Ws, and Uc are provided, needs to be executed just once.

In the subsequent step S4, the process of replacing the three-dimensional model, subject to three-dimensional analysis in step S3, by a two-dimensional model is performed. That is, a three-dimensional model, such as that shown in the upper diagram of FIG. 8, is replaced by a two-dimensional model, such as that shown in the upper diagram of FIG. 13. Here, in regard to the parameters concerning the two-dimensional layout, the parameters of the three-dimensional model can be used as they are in the two-dimensional model. That is, the sizes Wx and Wy of each aperture and the width Ws of each opaque part in the three-dimensional model shown in the upper diagram of FIG. 8 can be used as the sizes Wx and Wy of each aperture and the width Ws of each opaque part in the two-dimensional model shown in the upper diagram of FIG. 13. Needless to say, the same conditions are used as they are in regard to the exposure conditions.

A key point of this replacement process of step S4 is the method of replacing the parameters of trench depth d and undercut amount Uc of the trench in the three-dimensional model by the parameter of transmittance T in the two-dimensional model. At the present level of the art, an efficient method of directly converting the dimensional parameters of d and Uc in the three-dimensional model to the transmittance parameter T in the two-dimensional model has not been found. The inventor of the present application thus reached a new method of performing such a conversion using light intensity deviation D as an intermediary. By this method, the dimensional parameters of d and Uc in the three-dimensional model can be converted to the transmittance parameter T in the two-dimensional model by the following procedure.

First, of the parameters of the three-dimensional model, the sizes Wx and Wy of each aperture and the width Ws of each opaque part are used as they are in the two-dimensional model. As a result, a two-dimensional layout, such as that shown in the upper diagram of FIG. 13 can be defined. However, the transmittance T of aperture 112 at the right side, when the transmittance of aperture 111 at the left side is set to 100%, is still indeterminate. A plurality of arbitrary values are thus set for this transmittance T, and for each case, two-dimensional analysis is performed and light intensity distributions, such as those shown in the lower diagram of FIG. 13, are determined to determine light intensity deviations. Consequently, a light intensity deviation is determined by computation for each of a plurality of transmittances T. Among the plurality of light intensity deviations obtained in this manner, one which matches the light intensity deviation D determined in step S3 is selected and here, the transmittance T that provides this matching result becomes the transmittance that is to be determined.

Specifically, the transmittance is set, for example, at 1% increments such that T=99%, 98%, 97%, . . . , 51%, 50%, and for each of the cases, wherein, for a pair of apertures having the predetermined sizes Wx, Wy, and Ws, such as shown in the upper diagram of FIG. 13, the transmittance of the left aperture 111 is set to 100% and the transmittance of the right aperture 112 is varied at 1% increments in the range of 99% to 50%, a two-dimensional simulation is performed to determine a light intensity deviation for each case, and the transmittance with which a value closest to the light intensity deviation D determined by three-dimensional analysis in step S3 is set as the transmittance T of the two-dimensional model.

That is, this method can be said to be a so-called trial-and-error method wherein two-dimensional analysis is performed for each of a plurality of transmittances to determine a light intensity deviation D for each case, and a transmittance, by which a result matches the light intensity deviation D obtained in the three-dimensional analysis step, is determined as the transmittance T. As mentioned above, since a two-dimensional simulation is extremely light in computation load and extremely short in computation time in comparison to a three-dimensional simulation, even if such a trial-and-error method is adopted, there will be no problems in terms of practical use.

Consequently, the task performed in step S4 is to determine a transmittance T such that, when a two-dimensional structural body defined by the two-dimensional layout designed in step S1 is used and, with a pair of adjacent apertures, the light transmittance of one aperture is set to 100% and the light transmittance of the other is set to T %, the deviation in the intensities of light transmitted through each of the pair of adjacent apertures becomes equal to the light intensity deviation D determined in step S3. A two-dimensional model which is equivalent to the three-dimensional model that is subject to three-dimensional analysis in step S3, is thus determined.

Lastly, in step S5, correction of the two-dimensional layout is performed using this equivalent two-dimensional model. That is, based on the specific transmittance T determined in step S4, a correction amount δ is determined for the width of each aperture of the two-dimensional layout designed in step S1. Specifically, as mentioned already, a correction, such as that shown in the upper diagram of FIG. 14, is performed on a two-dimensional model shown in the upper diagram of FIG. 13, so that the widths Wx of the apertures 111 and 113 are corrected to Wxa and Wxb, respectively. Here, the correction amount δ is set to an appropriate value by which the intensity distribution graphs of the light transmitted through the apertures 111* and 112* after correction will be equal as shown in the lower diagram of FIG. 14 (by which the light intensity deviation D will be made zero).

A trial-and-error type two-dimensional simulation may be employed as a method of determining an optimal correction amount δ in a condition when values of widths Wx and Wy of each aperture, width Ws of each opaque part, and transmittance T of one aperture with respect to the other aperture are given. For example, a plurality of correction amounts δ are set, a two-dimensional simulation of determining a light intensity deviation D is executed under predetermined exposure conditions (the same exposure conditions as those of the simulations performed up until now) for each case, and a correction amount δ, with which light intensity deviation D will be closest to zero, is determined.

When step S5 is thus completed, a corrected two-dimensional layout, such as that shown in the upper diagram of FIG. 14 is obtained, and the three-dimensional structure determined in step S2 (trench depth d and undercut amount Uc) is applied to this corrected two-dimensional layout to determine a corrected three-dimensional structural body. Since in this case, the undercut amount Uc indicates the distance between the position of the outline of a trench and the position of the outline of an aperture after correction, in a case where for example as shown in the upper diagram of FIG. 14, the width in the X-axis direction of aperture 112* is widened by just 2 δ by the correction, the trench width is also widened by just 2 δ. Since the width in the X-axis direction of aperture 111* is oppositely narrowed by just 2 δ and the width Ws in the X-axis direction of opaque part 122* is therefore not changed, the dimensions of the parts of contact with substrate 200 of opaque part 122* will not be changed.

Though the widths of apertures are thus corrected by this correction of step S5, since the undercut amount Uc and the dimensions of the contacting parts of the opaque part are kept at the initially designed values, the problem of removal will not occur. Also as mentioned above, though the pitch P of apertures in the two-dimensional layout shown in FIG. 9 will be changed slightly, since the pitch 2P for two periods will be kept fixed, the essential characteristics of the "line and space pattern" will not be affected.

Thus, whereas conventionally, a computation of determining the optimal correction amount δ is performed by executing three-dimensional simulations on the three-dimensional model determined in steps S1 and S2, with the design method illustrated in FIG. 15, the optimal correction amount δ can be determined by performing the tasks of steps S3 and S4 to replace the three-dimensional model with a two-dimensional model and executing two-dimensional simulations on this two-dimensional model in step S5. Since as already mentioned, a two-dimensional simulation is significantly lighter in load than a three-dimensional simulation, the designing method for phase mask of the present invention enables the work load of designing a phase shift mask to be lightened and the working time to be shortened.

Figure 16:
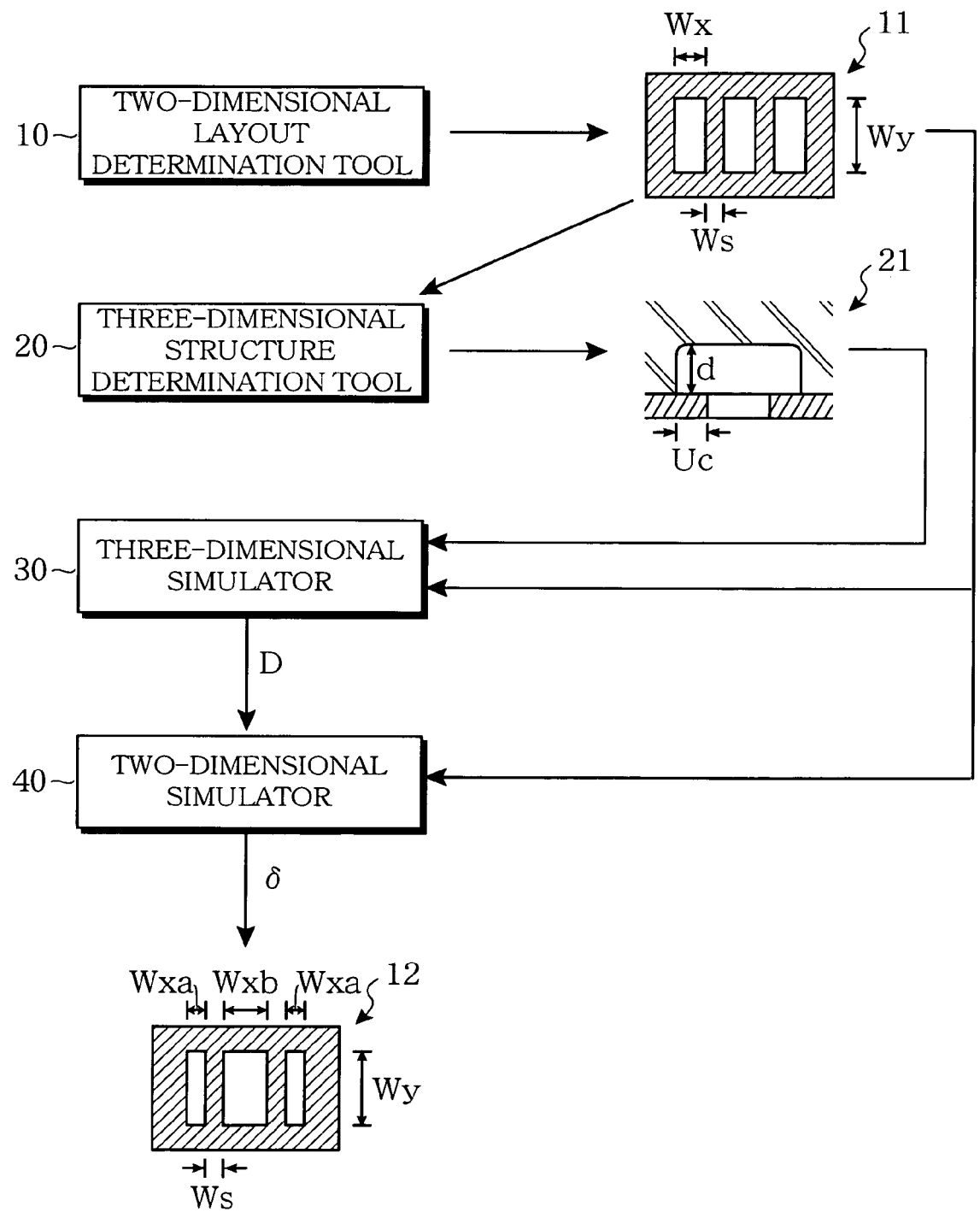
FIG. 16 is a block diagram, showing an arrangement of a phase shift mask designing device of a basic embodiment of this invention.

FIG. 16 is a block diagram, showing the arrangement of a phase shift mask designing device of a basic embodiment of this invention. As illustrated, this designing device comprises a two-dimensional layout determination tool 10, a three-dimensional structure determination tool 20, a three-dimensional simulator 30, and a two-dimensional simulator 40. All of these components, indicated as four blocks, are actually arranged using a computer and this designing device can be realized by incorporating software having processing functions as the respective components in the same computer.

Two-dimensional layout determination tool 10 is a component for executing the process of step S1 of the flowchart shown in FIG. 15 and, based on instructions from an operator, determines the width Wx in the X-axis direction and the width Wy in the Y-axis direction of each aperture and the width Ws of each opaque part on an XY plane defined on the surface of a substrate for forming a phase shift mask and positions a plurality of apertures of the same size at least along the X-axis to determine a two-dimensional layout on the XY plane. In the Figure, a simple example of a two-dimensional layout pattern 11 that has been determined by this two-dimensional layout determination tool 10 is illustrated for the sake of description. This two-dimensional layout pattern 11 is a pattern of the initial stage of design and is subsequently subject to correction. To determine the illustrated two-dimensional pattern 11, operator's instructions, indicating the respective dimensional values of Wx, Wy, and Ws, the total number of apertures, the direction of positioning, etc., are input.

Three-dimensional structure determination tool 20 is a component for executing the process of step S2 of the flowchart shown in FIG. 15 and, based on instructions from an operator, executes the process of determining whether or not phase shifting is to be performed for each of the plurality of apertures in two-dimensional layout pattern 11 and determining, for apertures with which phase shifting is to be performed, the trench depth d and the undercut amount Uc, which indicates the distance between the position of the outline of a trench and the position of the outline of an aperture, to thereby determine the three-dimensional structure. The trench depth d may be computed automatically based on the light source wavelength of the exposure tool. In the Figure, a simple example of a three-dimensional structure 21 that has been determined by this three-dimensional structure determination tool 20 is illustrated for the sake of description.

Three-dimensional simulator 30 is a component for executing the process of step S3 of the flowchart shown in FIG. 15 and executes the three-dimensional analysis process of using a three-dimensional structural body, which is defined by two-dimensional layout pattern 11 determined by two-dimensional layout determination tool 10 and three-dimensional structure 21 determined by three-dimensional structure determination tool 20, as a model to execute a three-dimensional simulation under predetermined exposure conditions to determine a light intensity deviation D that indicates the deviation of the intensities of light transmitted by each of a pair of adjacent apertures, which are designed to realize a phase shift of 180 degrees with respect to each other, when light is transmitted under the same conditions.

Though the three-dimensional analysis process executed by this three-dimensional simulator 30 is a process of considerably large computation load, the purpose of the three-dimensional analysis process executed here is to determine the light intensity deviation D for the three-dimensional model with a specific structure (structure defined by the specific parameter values Wx, Wy, Ws, d, and Ux) and is not a process such as that performed for determining an optimal correction amount δ. The computation load is thus far smaller in comparison to the case of a three-dimensional analysis process for determining the correction amount δ.

Two-dimensional simulator 40 is a component for executing the processes of steps S4 and S5 of the flowchart shown in FIG. 15. That is, as the two-dimensional analysis process of step S4, a two-dimensional structural body, defined by two-dimensional layout pattern 11 determined by two-dimensional layout determination tool 10, is used as a model and two-dimensional simulations are executed under the same exposure conditions as those of the above-described three-dimensional simulation. By this two-dimensional simulation, a transmittance T is determined such that, when for a pair of adjacent apertures, the light transmittance of one aperture is set to 100% and the light transmittance of the other aperture is set to T %, the deviation in the intensities of light transmitted through each of these pair of adjacent apertures becomes equal to the light intensity deviation D determined by three-dimensional simulator 30.

This process can thus be said to be a process of replacing the three-dimensional model, used in three-dimensional simulator 30, by a two-dimensional model. Specifically, a light intensity deviation D is determined for each of plurality of transmittances and the transmittance, which provides a result that matches the light intensity deviation D determined by the three-dimensional analysis process performed by three-dimensional simulator 30, is determined as the transmittance T.

Meanwhile, two-dimensional simulator 40 also has a function of executing the layout correction process, indicated in step S5 of the flowchart shown in FIG. 15. That is, a two-dimensional model, obtained by applying the transmittance T, determined by the above-described process, to the two-dimensional structural body defined by two-dimensional layout pattern 11, which is determined by two-dimensional layout determination tool 10, is used to perform two-dimensional simulations under the same exposure conditions as the exposure conditions used up until now to determine an optimal correction amount δ. The contents of the process of determining the correction amount δ are as have been described above in regard to the process of step S5. By using the correction amount 6 thus determined to perform layout correction on two-dimensional layout pattern 11, a corrected two-dimensional layout pattern 12 can be obtained as illustrated.

The final phase shift mask structure is thus determined from three-dimensional structure 21, determined by three-dimensional structure determination tool 20, and two-dimensional layout pattern 12, corrected by two-dimensional simulator 40.

<<<§ 5. More Practical Designing Method and Device>>>

With the basic embodiment described in § 4, three-dimensional analysis and two-dimensional analysis must be executed each time a new phase shift mask is to be designed. For example, with the flowchart of FIG. 15, a three-dimensional simulation using the given predetermined parameter values Wx, Wy, Ws, and Uc (the values of the exposure conditions and the trench depth d, etc., are also necessary in addition to these values) is performed to determine a light intensity deviation D. In step S4, two-dimensional simulations using the given predetermined parameter values Wx, Wy, and Ws, and a plurality of transmission settings T's (the values of the exposure conditions, etc., are also necessary in addition to these values) are performed to determine light intensity deviations D's so that a transmittance T, which provides a result that matches the light intensity deviation D determined in step S3, is determined. Furthermore in step S5, two-dimensional simulations using the given predetermined parameter values Wx, Wy, Ws, and T (the values of the exposure conditions, etc., are also necessary in addition to these values) are performed to determine an optimal correction value δ and a process of changing the widths Wx of the respective apertures to Wxa or Wxb is performed.

However, in terms of work, in cases where several phase shift masks must be designed, it is not necessarily efficient to perform the simulation tasks of steps S3, S4, and S5 each time. The practical embodiments described in this section incorporate measures for simplifying the simulation task performed in these steps. The basic concepts of these measure shall now be described.

First, consider the three-dimensional analysis in step S3. Here, if the light source wavelength of the exposure tools using a phase shift mask designed by this invention is fixed at a predetermined wavelength value and the optical conditions for the exposure task are also fixed (in other words, if the exposure conditions are fixed), the variable parameters of the three-dimensional simulation performed in step S3 will be the four parameters of the width Wx in the X-axis direction and the width Wy in the Y-axis direction of each aperture, the width Ws of each opaque part, and the undercut amount Uc. Thus if three-dimensional simulations are executed in advance on respective cases wherein the combinations of these four parameter values are differed variously and the values of the obtained light intensity deviation D are made available in the form of a database, when specific parameter values Wx, Wy, Ws, and Uc are provided, the light intensity deviation D that is needed can be obtained by just performing the task of searching the database and without having to perform a three-dimensional simulation.

Figure 17:
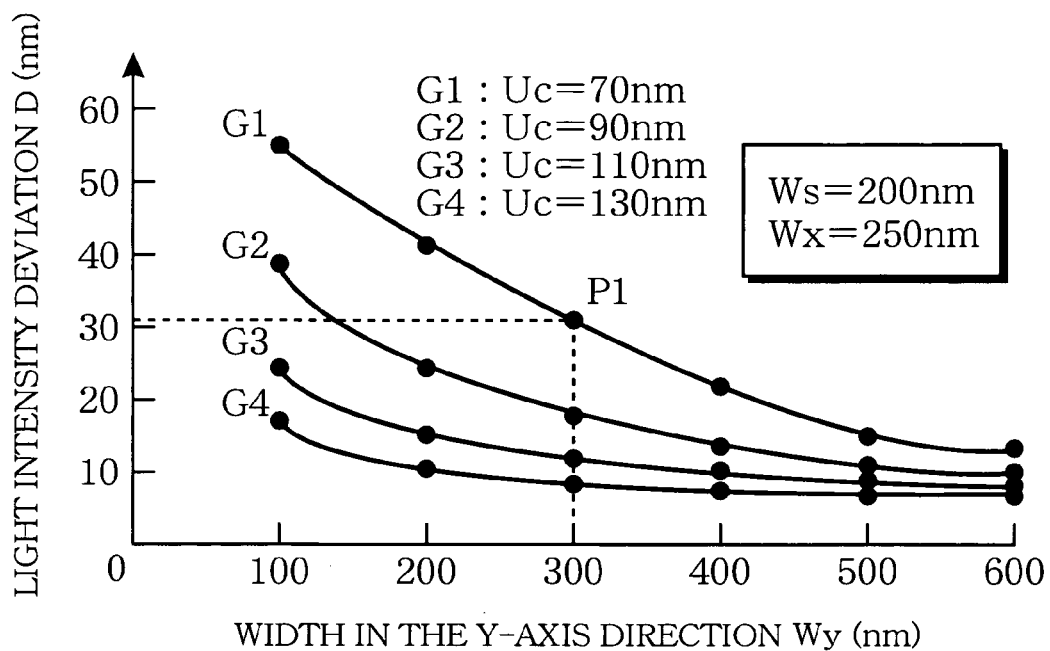
FIG. 17 is a graph, showing a light intensity deviation D obtained by three-dimensional analysis of step S3 of FIG. 15 with various parameters.

For example, the graphs of FIG. 17 show the results of determining the light intensity deviation D for cases where Ws is set to 200 nm, Wx is set to 250 nm, Wy is varied among the six values of 100, 200, 300, 400, 500, and 600 nm, and Uc is varied among the four values of 70, 90, 110, and 130. In other words, shown here are the results of executing three-dimensional simulations in advance on a total of 24 combinations of parameter values and determining the light intensity deviation D for each combination. Needless to say, in actuality, similar graphs are prepared by varying the parameters Ws and Wx in a plurality of ways as well.

Though the computation load for determining the values of the light intensity deviation D by three-dimensional simulation for all combinations becomes vast as the number of combinations of parameters increases, once such computations are performed and the results are stored in a database, it becomes possible thereafter to determine the light intensity deviation D for an arbitrary combination of parameter values by simply searching the database and without having to execute a three-dimensional simulation. For example, in the case where a specific combination of parameters of Ws=200 nm, Wx=250 nm, Wy=300 nm, and Uc=70 nm is provided, by referencing the ordinate value of the point P1 that corresponds to the abscissa value Wy=300 nm of graph G1 (the graph for Uc=70 nm) of FIG. 17, the result of light intensity deviation D=31 nm can be obtained. Since in actuality, graphs are not referenced but a database is simply searched based on the four parameter values, the required light intensity deviation D can be determined by an extremely simple process in comparison to the case of determining the light intensity deviation by actually performing a three-dimensional simulation.

This method may also be applied to the two-dimensional analysis in step S4. That is, the variable parameters in the two-dimensional simulations carried out in step S4 are the four parameters of the width Wx in the X-axis direction and the width Wy in the Y-axis direction of each aperture, the width Ws of each opaque part, and the transmittance T. Thus if two-dimensional simulations are executed in advance on respective cases wherein the combinations of these four parameter values are differed variously and the values of the obtained light intensity deviation D are made available in the form of a database, when specific parameter values Wx, Wy, Ws, and T are provided, the light intensity deviation D that is needed can be obtained by just performing the task of searching the database and without having to perform two-dimensional simulations.

Figure 18:
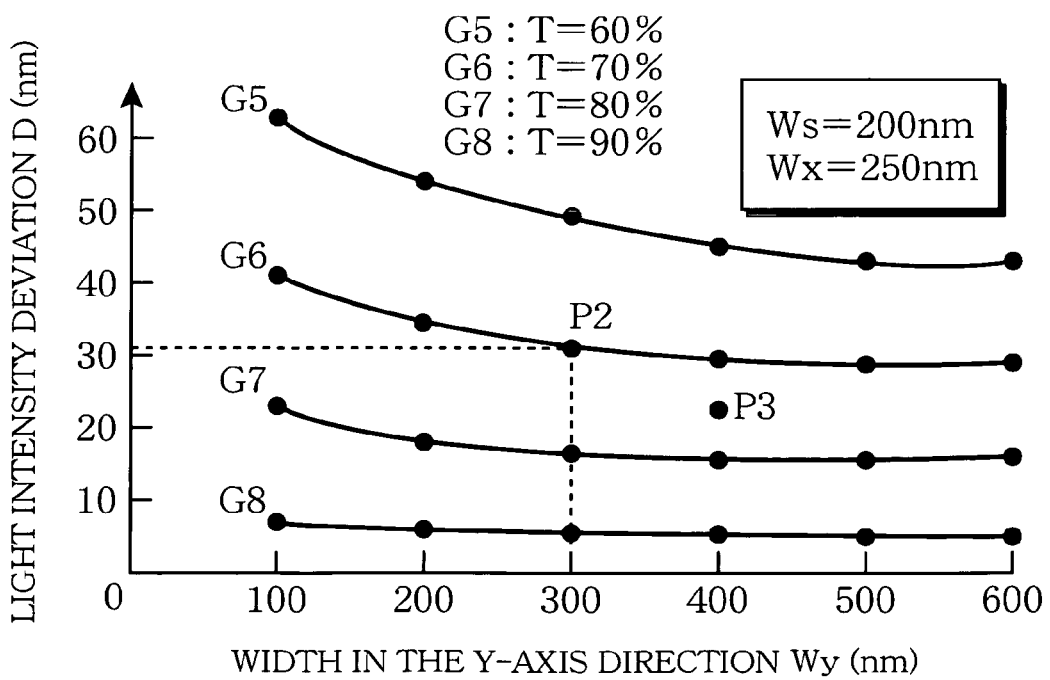
FIG. 18 is a graph, showing a light intensity deviation D obtained by two-dimensional analysis of step S4 of FIG. 15 with various parameters.

For example, the graphs of FIG. 18 show the results of determining the light intensity deviation D for cases where Ws is set to 200 nm, Wx is set to 250 nm, Wy is varied among the six values of 100, 200, 300, 400, 500, and 600 nm, and T is varied among the four values of 60%, 70%, 80% and 90%. In other words, shown here are the results of executing two-dimensional simulations in advance on a total of 24 combinations of parameter values and determining the light intensity deviation D for each combination. Needless to say, in actuality, similar graphs are prepared by varying the parameters Ws and Wx in a plurality of ways as well.

Once such computations are performed and the results are stored in a database, it becomes possible thereafter to determine the light intensity deviation D for an arbitrary combination of parameter values by simply searching the database and without having to execute two-dimensional simulations. For example, in the case where a specific combination of parameters of Ws=200 nm, Wx=250 nm, Wy=300 nm, and T=70% is given, by referencing the ordinate value of the point P2 that corresponds to the abscissa value Wy=300 nm of graph G6 (the graph for T=70%) of FIG. 18, the result, light intensity deviation D=31 nm, can be obtained.

The primary purpose of the process of step S4 is not to determine a light intensity deviation D from a combination of the four parameters of Ws, Wx, Wy, and T. The primary purpose of the process of step S4 is to determine a transmittance T, with which the same light intensity deviation as the light intensity deviation D determined in the process of step S3 can be obtained. The method using a database, described in this § 5 is extremely convenient for such a process of determining the transmittance T.

For example, as mentioned above, when, in the process of step S3, a specific combination of parameters such that Ws=200 nm, Wx=250 nm, Wy=300 nm, and Uc=70 nm is given, the result, light intensity deviation D=31 nm, is determined from the ordinate value of the point P1 on the graph G1 (graph of Uc=70 nm) of FIG. 17. The purpose of step S4 is to determine a transmittance T by which the thus-determined light intensity deviation D=31 nm can be obtained. For this purpose, the graph of FIG. 18 that corresponds to the parameter values of Ws=200 nm and Wx=250 nm is referenced and a point P2 having an abscissa value of Wy=300 nm and an ordinate value of D=31 nm is searched. With the example of FIG. 18, since point P2 is a point on graph G6, the transmittance T to be determined is T=70%.

Though with the example shown in FIG. 18, the point P2 happened to be a point on graph G6 and the transmittance T=70% was obtained immediately, in a case where point P2 is not a point on any of the graphs, the nearest graph may be selected and the transmittance T of this graph may be selected. Though the graphs of FIG. 18 are determined for 10% increments of transmittance T, if, for example, graphs are determined at 1% increments, a selection of a nearby graph will enable an accurate transmittance T to be determined at a unit of 1%. If an even more accurate value is required, the increment width is set even more finely.

Thus if the parameter values of Ws=200 nm, Wx=250 nm, and Wy=300 nm are determined in the step of two-dimensional layout designing of step S1 and the parameter value of Uc=70 nm is determined in the step of three-dimensional structure determination of step S2, the light intensity deviation value of D=31 nm can be determined in step S3 by just a process of searching the ordinate value of a point P1 on the graph of FIG. 17 that is prepared as a database, and a transmittance value of T=70% can be determined in step S4 by just a process of searching, from a database, of a graph G6 near a point P2 having the parameter D=31 nm as the ordinate value and having Wy=300 nm as the abscissa value.

This method of using a database can also be applied to the two-dimensional layout correction process of step S5. That is, the variable parameters for the two-dimensional simulation for determining an appropriate correction amount δ in step S5 are the four parameters of the width Wx in the X-axis direction and the width Wy in the Y-axis direction of each aperture, the width Ws of each opaque part, and the transmittance T. Thus by performing two-dimensional simulations with a plurality of correction amounts δ being set for each of various different combinations of the four parameters, it becomes possible to determine to what value the correction amount δ should be set to enable an appropriate correction (that is, a correction by which the light intensity deviation D for the transmitted light of both apertures will be zero). Here, by determining appropriate correction amounts δ for combinations of specific parameter values Wx, Wy, Ws, and T in advance and preparing a database according to combination, the required correction amount δ can be obtained thereafter by just a task of searching this database and without having to perform two-dimensional simulations.

As mentioned above, in a case where the method of executing two-dimensional simulations or three-dimensional simulations in advance for various combinations of parameters and storing the results in the form of a database, a more detailed database can be prepared by making the increment widths of the parameters finer and searching of such a database enables more accurate results to be obtained. However, there arises the problem that as the increment widths of the parameters are made finer, the number of parameter combinations to be subject to simulation becomes vast.

Interpolation operations are effective for preventing such a problem. That is, in a case where a parameter value that matches the search condition does not exist among the combinations of parameter values prepared in a database, a more accurate value can be determined by performing an interpolation operation using parameter values that are close. For instance, with the example illustrated in FIG. 18, the transmittances T are made available only at 10% increments. Here, if the need to determine the transmittance T corresponding to the point P3 in the Figure arises, one of either graph G6 or G7 is selected as the graph close to P3 and for the transmittance T, T=70% or T=80% is determined. In such a case, by selecting both graphs G6 and G7 as graphs close to point P3 and determining, for example, a value of transmittance T=75% by an interpolation operation, a more accurate value can be obtained.

Figure 19:
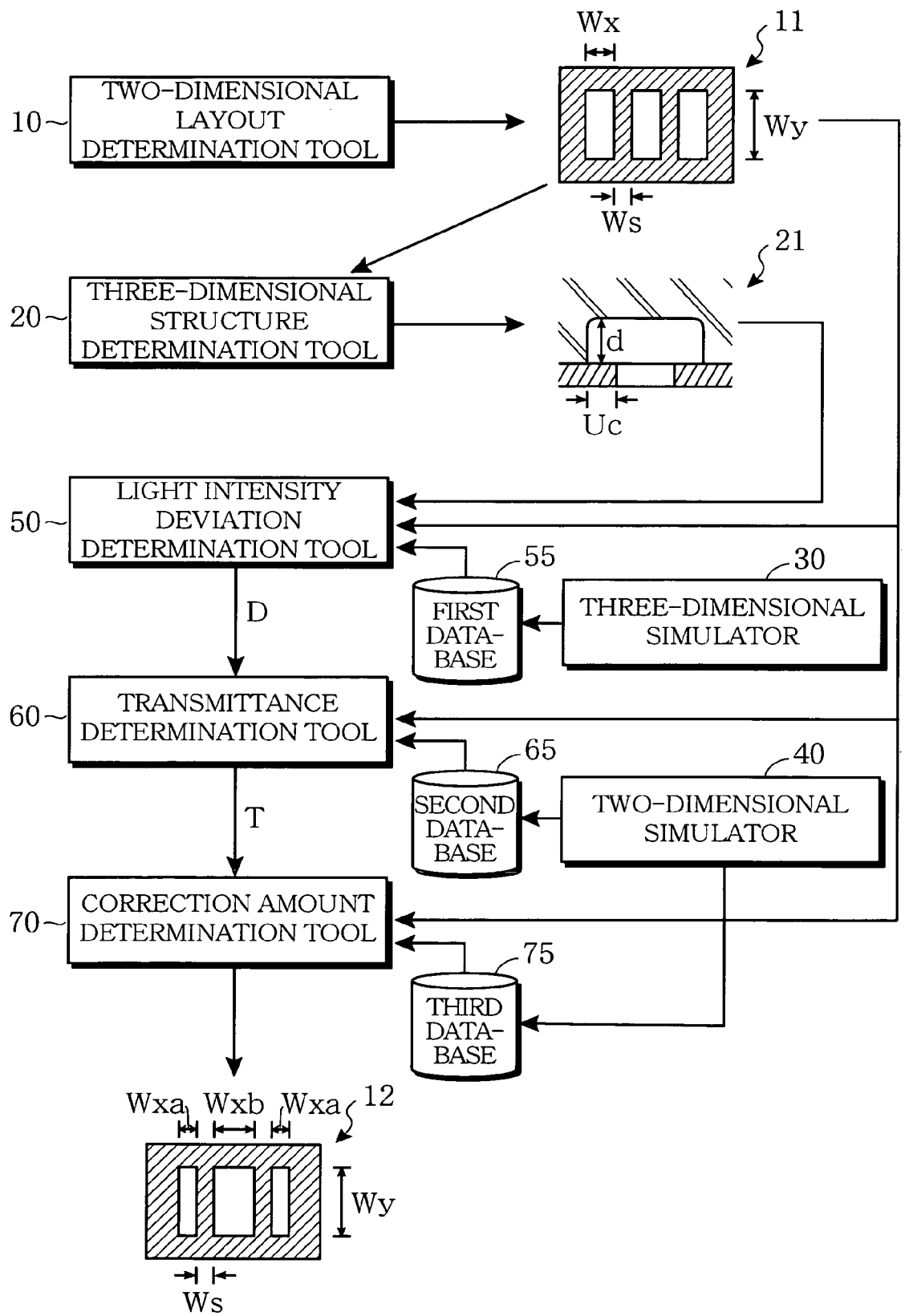
FIG. 19 is a block diagram, showing a basic arrangement of a phase shift mask designing device of an embodiment in practical of this invention.

Next, a phase shift designing device, which enables the work of designing each individual phase shift mask to be made more efficient by the preparation of such databases, shall be described. FIG. 19 is a block diagram, showing the basic arrangement of such a designing device. As illustrated, this designing device comprises a two-dimensional layout determination tool 10, a three-dimensional structure determination tool 20, a light intensity deviation determination tool 50, a first database 55, a transmittance determination tool 60, a second database 65, a correction amount determination tool 70, and a third database 75. The three-dimensional simulator 30 and two-dimensional simulator 40 that are shown in the Figure are components used for preparing the respective databases 55, 65, and 75 and are not components that make up the phase shift mask designing device of the present invention itself. In other words, once the respective databases 55, 65, and 75 have been prepared, three-dimensional simulator 30 and two-dimensional simulator 40 become unnecessary.

Here, two-dimensional layout determination tool 10 and three-dimensional structure determination tool 20 are exactly the same components shown in FIG. 16 and detailed descriptions thereof shall be omitted. As mentioned above, a desired two-dimensional layout pattern 11 is determined when an operator instructs the dimensions of each aperture and opaque part, etc., to two-dimensional layout determination tool 10. Also, a desired three-dimensional structure 21 is determined when the operator instructs the undercut amount Uc, etc., to three-dimensional structure determination tool 20.

Meanwhile, light intensity deviation determination tool 50 is a component for executing the process corresponding to step S3 of the flowchart of FIG. 15 without performing a three-dimensional simulation and enables the process of determining the required light intensity deviation D to be performed by the searching of first database 55. That is, light intensity deviation determination tool 50 has the function of determining a specific light intensity deviation D by searching first database 55 using the specific parameter values determined at two-dimensional layout determination tool 10 and three-dimensional structure determination tool 20.

In first database 55, values of the light intensity deviation D, each defined as a value that indicates the deviation of the intensities of light transmitted through each of a pair of adjacent apertures, of a predetermined three-dimensional structural body and being designed to realize a phase shift of 180 degrees with respect to each other, when light is transmitted through the apertures under the same conditions, are stored according to various different combinations of the four parameter values of the width Wx in the X-direction and the width Wy in the Y-axis direction of each aperture, the width Ws of each opaque part, and the undercut amount Uc. Specifically, values of the light intensity deviation D for cases where the four parameter values are differed variously as shown by the graphs in FIG. 17 are stored in the form of a database. As mentioned above, such a database can be prepared by performing three-dimensional simulations in advance by means of three-dimensional simulator 30.

Transmittance determination tool 60 is a component for executing the process corresponding to step S4 of the flowchart of FIG. 15 without performing two-dimensional simulations and enables the process of determining the required transmittance T to be performed by the searching of second database 65. That is, transmittance determination tool 60 has the function of searching second database 65 using the specific parameter values determined at two-dimensional layout determination tool 10 and the specific light intensity deviation D determined at light intensity deviation determination tool 50 to determine a transmittance T, by which a light intensity deviation equal to the specific light intensity deviation D is obtained.

In second database 65, values of the light intensity deviation D, each defined as a value that indicates the deviation of the intensities of light transmitted through each of a pair of adjacent apertures, which are of a predetermined two-dimensional structural body and with which the transmittance of one has been set to 100% and the transmittance of the other has been set to T %, when light is transmitted through the apertures under the same conditions, are stored according to various different combinations of the four parameter values of the width Wx in the X-direction and the width Wy in the Y-axis direction of each aperture, the width Ws of each opaque part, and the transmittance T. Specifically, values of the light intensity deviation D for cases where the four parameter values are differed variously as shown by the graphs in FIG. 18 are stored in the form of a database. As mentioned above, such a database can be prepared by performing two-dimensional simulations in advance by means of two-dimensional simulator 40.

Lastly, correction amount determination tool 70 is a component for executing the process corresponding to step S5 of the flowchart of FIG. 15 without performing two-dimensional simulations and enables the process of determining the required correction amount δ to be performed by the searching of third database 75. That is, correction amount determination tool 70 has the function of searching third database 75 using the specific parameter values determined at two-dimensional layout determination tool 10 and the specific transmittance T determined at transmittance determination tool 60 to determine a correction amount δ for two-dimensional layout pattern 11 and outputting the corrected two-dimensional layout pattern 12.

In third database 75, values of the correction amount δ, each of which concerns the widths of the respective apertures and is required to make equal the intensities of light transmitted under the same conditions through each of a pair of adjacent apertures, which are of a predetermined two-dimensional structural body, are of the same size, and with which the transmittance of one has been set to 100% and the transmittance of the other has been set to T %, are stored according to various different combinations of the four parameter values of the width Wx in the X-direction and the width Wy in the Y-axis direction of each aperture, the width Ws of each opaque part, and the transmittance T. As mentioned above, such a database can be prepared by performing two-dimensional simulations in advance by means of two-dimensional simulator 40.

By incorporating the above-described interpolation operation function in light intensity deviation determination tool 50, transmittance determination tool 60, and correction amount determination tool 70, the light intensity deviation D, transmittance T, and correction amount δ can be determined more accurately by interpolation operations using close parameter values in cases where values that match the search conditions do not exist among the combinations of parameter values prepared inside the corresponding databases 55, 65, and 75.

With the above-described embodiment, the data prepared in advance in the respective databases 55, 65, and 75 are data obtained based on results of simulations performed for specific exposure conditions by using a specific exposure tool. Thus in a case where phase shift masks that are to be used with a plurality of mutually differing exposure tools are to be designed, simulations are executed for each case in which the exposure wavelength, numerical aperture, illumination, etc., are changed and the respective results are prepared as separate databases according to exposure conditions. In this case, when a phase shift mask suited to a specific set of exposure conditions is to be designed, the specific database that was obtained based on results of simulations under this set of exposure conditions is selected and used.

Though in FIG. 19, the respective components are indicated as blocks, that is, as mutually independent tools for the sake of description, in actuality, all of these components are realized by incorporation of predetermined software in a computer and in terms of hardware, the same computer may be used to realize the respective components.

Furthermore, though with the designing device shown in FIG. 19, all of steps S3, S4, and S5 in the flowchart of FIG. 15 are executed as search processes using first database 55, second database 65, and third database 75, such a method of using database search need not be performed in all of steps S3, S4, and S5 and may be employed selectively in the necessary steps. For example, if a method is to be employed wherein a database search is to be used only for the process of determining the light intensity deviation D by three-dimensional analysis (the process of step S3), arrangements may be made so that the process of step S3 is executed by searching of first database 55 by means of light intensity deviation determination tool 50, while the processes of steps S4 and S5 are executed by the two-dimensional simulator 40 shown in FIG. 16.

<<<§ 6. Other Modification Examples>>>

Lastly, modification examples of the designing method and device for phase shift mask of the present invention shall be described.

(1) Though with the embodiments described up until now, the two parameters of the width Wx in the X-axis direction and the width Wy in the Y-axis direction were used as parameters for indicating the width of an aperture, these two parameters do not have to be used necessarily in putting this invention to practice. For example, in a case of a "line and space pattern" wherein a plurality of apertures 110, with each of which the width Wy in the Y-axis direction is comparatively large in comparison to the width Wx in the X-axis direction, are aligned in the X-axis direction as shown in FIG. 9, a large error will not occur even if the width Wy in the Y-axis direction is handled as being infinite.

Figure 20:
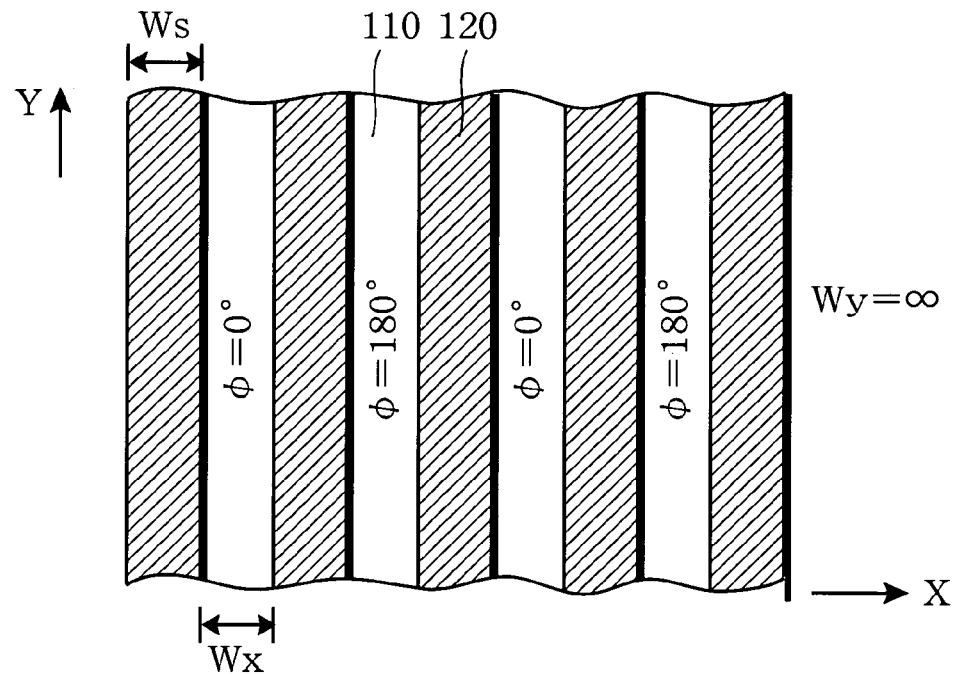
FIG. 20 is a plan view, illustrating the concept of a two-dimensional layout pattern of the first variation of the invention (the hatching indicates opaque parts and not cross sections).

FIG. 20 is a plan view, illustrating the concept of such handling. With this example, four apertures 110 and opaque parts 120 are positioned alternatively in the X-axis direction, and for the respective apertures 110, φ is set equal to 0 degree and 180 degrees alternatively. Here, though finite, actual dimension values are set for both the width Wx in the X-axis direction of each aperture 110 and the width Ws in the X-axis direction of each opaque part 120, an imaginary dimensional setting of infinity is set for the width Wy in the Y-axis direction of each aperture 110. Though obviously a finite actual dimension must be set for the width Wy with the actual two-dimensional layout pattern, by setting the width Wy to infinity in carrying out a three-dimensional simulation or a two-dimensional simulation, the width Wy can be eliminated from among the parameters to be considered.

By thus eliminating the width Wy from among the parameters to be considered, for example, it becomes possible, in the three-dimensional analysis of step S3 in the flowchart of FIG. 15, to determine the light intensity deviation D using just the three parameters Wx, Ws, and Uc, and it also becomes possible, in the two-dimensional analysis of steps S4 and S5, to perform analysis using just the three parameters Wx, Ws, and Uc. Needless to say, in a case of an embodiment with which databases are to be prepared in advance, it is sufficient to prepare databases with which the width Wy has been excluded from the parameters.

(2) Though with the embodiments described up until now, only examples where a layout, with which a plurality of apertures are aligned in the X-axis direction, is prepared in the two-dimensional layout designing step was described, this invention is also applicable to a layout, wherein a plurality of apertures are positioned in a two-dimensional matrix form in the X-axis direction and the Y-axis direction.

Figure 21:
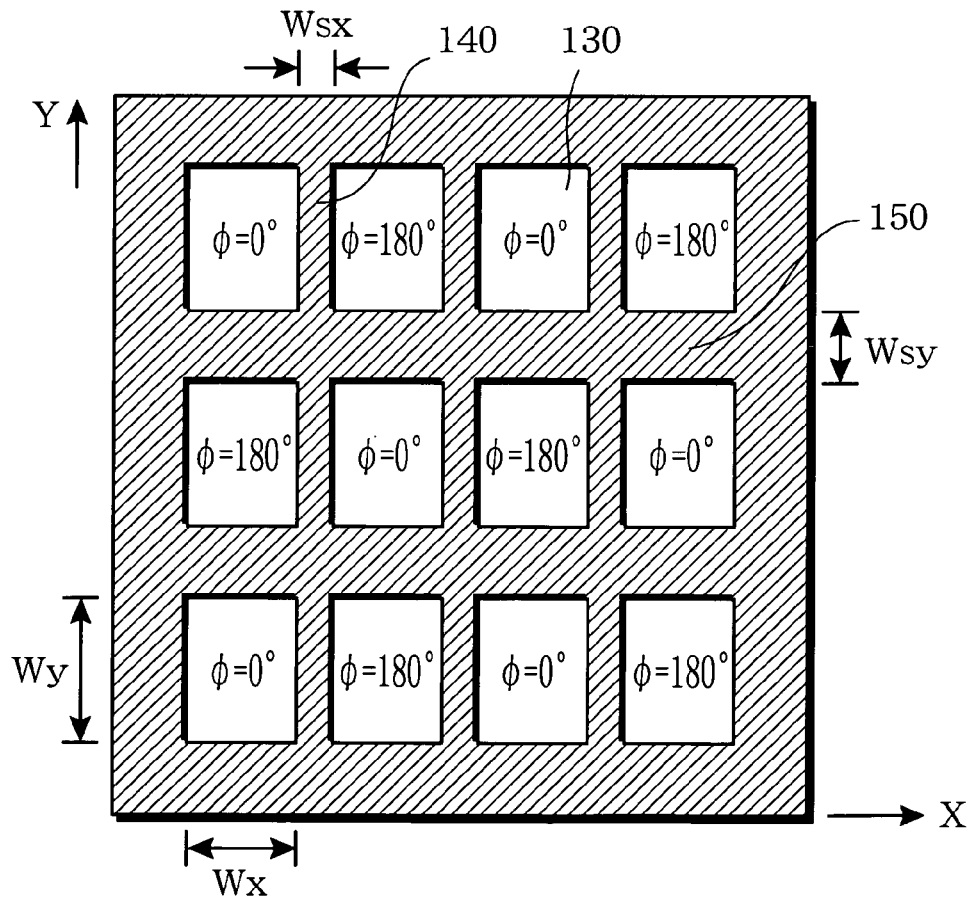
FIG. 21 is a plan view, illustrating the concept of a two-dimensional layout pattern of the second variation of the invention (the hatching indicates opaque parts and not cross sections).

For example, FIG. 21 shows a two-dimensional layout pattern, in which four apertures 130 of the same size are aligned in the X-axis direction and three apertures 130 are aligned in the Y-axis direction. When such a layout is designed with apertures 130 being positioned in a two-dimensional matrix form, the determination that phase shifting is to be performed with every other aperture in both the X-axis direction and the Y-axis direction is made for the plurality of apertures aligned in either the X-axis direction or the Y-axis direction in the three-dimensional structure determination step. As a result, apertures with which phase shifting is not to be performed (apertures with the setting, φ=0 degree) and apertures with which phase shifting is to be performed (apertures with the setting, φ=180 degrees) are positioned in the form of a checkered pattern.

In a case where, as in the example of FIG. 21, the width Wsx in the X-axis direction of an opaque part 140 existing between apertures that are adjacent in the X-axis direction differs from the width Wsy in the Y-axis direction of an opaque part 150 existing between apertures that are adjacent in the Y-axis direction, analysis using these two parameters Wsx and Wsy must be performed in each simulation process.

(3) With the embodiments described up until now, the process of determining the light intensity deviation D in the three-dimensional analysis step of step S3 shown in FIG. 15, the process of determining the transmittance T in the two-dimensional analysis step of step S4, and the correction process of the layout correction step of step S5 were all described with the premise of being executed using computer simulation. However, these processes do not have to be executed necessarily by computer simulation, and a part or all of these processes may be executed by experiments using an actually manufactured phase shift mask.

In particular with regard to three-dimensional analysis, since a three-dimensional simulation by a computer requires a considerable amount of computation time, it may be more effective in some cases to actually manufacture a phase shift mask with dimensions that are in accordance to the given parameters and to actually measure the light intensity deviation D by actually performing an experiment of illuminating light.

Needless to say, the method for preparing the respective databases 55, 65, and 75 shown in FIG. 19 is also not limited to a computer simulation method. That is, the data may be actually measured in experiments using actually manufactured phase shift masks and the measured data may be stored in the databases.

INDUSTRIAL APPLICABILITY

As described above, the designing method and device for phase shift mask of the present invention enable the work load spent on designing a phase shift mask to be lightened and the working time to be shortened. This invention is thus an art that is widely applicable in the field of semiconductor manufacturing processes.

What is claimed is:

1. A method for designing a phase shift mask, having a substrate (200) with a transparent property, and an opaque layer (100) formed on said substrate and having an opaque property, wherein a plurality of rectangular apertures are formed in said opaque layer, a two-dimensional layout pattern is formed by opaque parts (120) comprising regions at which said opaque layer is formed, and transparent parts (110) comprising regions at which said apertures are formed, and for a pair of adjacently disposed apertures, so that a phase of light transmitted through one of said pair of adjacent apertures will be shifted by 180 degrees with respect to a phase of light transmitted through other of said pair of adjacent apertures, a trench (220), having a predetermined depth and an outline greater than an outline of said one aperture, is formed on a portion of said substrate at which said one aperture is formed, said phase shift mask designing method comprising the steps of:

a two-dimensional layout designing step (S1) of defining an XY plane on a surface of said substrate, determining a width Wx in an X-axis direction and a width Wy in a Y-axis direction of an aperture and a width Ws of an opaque part, and positioning a plurality of apertures of a same size at least along the X-axis to thereby design a two-dimensional layout on said XY plane;

a three-dimensional structure determination step (S2) of determining, for each of said plurality of apertures, whether or not phase shifting is to be performed and determining, for the apertures with which phase shifting is to be performed, a trench depth d and an undercut amount Uc, which indicates a distance between a position of an outline of the trench and a position of the outline of the aperture, to thereby determine a three-dimensional structure;

a three-dimensional analysis step (S3) of using a three-dimensional structural body, which is defined by said two-dimensional layout designing step and said three-dimensional structure determination step, to determine a light intensity deviation D, which indicates, for a case where light is transmitted under same exposure conditions through a pair of adjacent apertures that have been designed to realize a phase shift of 180 degrees with respect to each other, a deviation in intensities of light transmitted through the respective apertures;

a two-dimensional analysis step (S4) of using a two-dimensional structural body, which is defined by said two-dimensional layout, to determine, in a case where, for said pair of adjacent apertures, a light transmittance of one aperture is set to 100% and a light transmittance of the other aperture is set to T %, a transmittance T such that a deviation in intensities of light transmitted through each of said pair of adjacent apertures will be equal to said light intensity deviation D; and a layout correction step (S5) of correcting said two-dimensional layout based on said transmittance T.

2. The phase shift mask designing method as set forth in claim 1, wherein in the two-dimensional analysis step, a light intensity deviation D is determined for each of a plurality of transmittances and a transmittance, which provides a result matching the light intensity deviation D determined in the three-dimensional analysis step, is determined as the transmittance T.

3. The phase shift mask designing method as set forth in claim 2, wherein in the two-dimensional analysis step, a database, with which a value of the light intensity deviation D is determined for each of various different combinations of parameter values of the width Wx in the X-direction of an aperture, the width Ws of an opaque part, and the transmittance T, is prepared in advance, and in determining a light intensity deviation D for a specific two-dimensional structural body, said database is searched to determine the light intensity deviation D.

4. The phase shift mask designing method as set forth in claim 3, wherein a database, having the width Wy in the Y-axis direction of an aperture in addition as a parameter value, is prepared.

5. The phase shift mask designing method as set forth in claim 3, wherein in a case where a combination of parameter values that matches search conditions does not exist among combinations of parameters prepared inside the database, an interpolation operation using parameter values that are close is performed.

6. The phase shift mask designing method as set forth in claim 3, wherein in the two-dimensional layout designing step, a plurality of apertures are positioned in two-dimensional matrix form in the X-axis direction and the Y-axis direction, and as the width Ws of the opaque parts, two parameters of a width Wsx in the X-axis direction of an opaque part existing between apertures that are adjacent in the X-axis direction and a width Wsy in the Y-axis direction of an opaque part existing between apertures that are adjacent in the Y-axis direction are used.

7. The phase shift mask designing method as set forth in claim 1, wherein in the three-dimensional analysis step, a database, with which a value of the light intensity deviation D is determined for each of various different combinations of parameter values of the width Wx in the X-direction of an aperture, the width Ws of an opaque part, and the undercut amount Uc, is prepared in advance, and in determining a light intensity deviation D for a specific three-dimensional structural body, said database is searched to determine the light intensity deviation D.

8. The phase shift mask designing method as set forth in claim 1, wherein in the layout correction step, a database, with which an optimal correction amount δ is determined for each of various different combinations of parameter values of the width Wx in the X-direction of an aperture, the width Ws of an opaque part, and the transmittance T, is prepared in advance, and in performing a correction of a specific two-dimensional layout, with which a specific transmittance is defined, said database is searched to determine the optimal correction amount δ.

9. The phase shift mask designing method as set forth in claim 1, wherein in the three-dimensional structure determination step, apertures with which phase shifting is to be performed are determined so that every other aperture of the plurality of apertures that are positioned along the X-axis direction or the Y-axis direction are selected.

10. The phase shift mask designing method as set forth in claim 1, wherein a part or all of the process of determining the light intensity deviation D in the three-dimensional analysis step, the process of determining the transmittance T in the two-dimensional analysis step, and the correction process in the layout correction step are executed using computer simulation.

11. The phase shift mask designing method as set forth in claim 1, wherein a part or all of the process of determining the light intensity deviation D in the three-dimensional analysis step, the process of determining the transmittance T in the two-dimensional analysis step, and the correction process in the layout correction step are executed by experimentation using an actually manufactured phase shift mask.

12. A device for designing a phase shift mask, having a substrate (200) with a transparent property, and an opaque layer (100) formed on said substrate and having an opaque property, wherein a plurality of rectangular apertures are formed in said opaque layer, a two-dimensional layout pattern is formed by opaque parts (120) comprising regions at which said opaque layer is formed, and transparent parts (110) comprising regions at which said apertures are formed, and for a pair of adjacently disposed apertures, so that a phase of light transmitted through one of said pair of adjacent apertures will be shifted by 180 degrees with respect to a phase of light transmitted through another of said pair of adjacent apertures, a trench (220), having a predetermined depth and an outline greater than an outline of said one aperture, is formed on a portion of said substrate at which said one aperture is formed, said phase shift mask designing device comprising:

a two-dimensional layout determination tool (10), which, based on instructions from an operator, determines a width Wx in an X-axis direction and a width Wy in a Y-axis direction of an aperture and a width Ws of an opaque part on an XY plane defined on a surface of said substrate and positions a plurality of apertures of a same size at least along the X-axis to determine a two-dimensional layout on said XY plane;

a three-dimensional structure determination tool (20), which, based on instructions from an operator, determines whether or not phase shifting is to be performed for each of the plurality of apertures and determines, for apertures with which phase shifting is to be performed, a trench depth d and an undercut amount Uc, which indicates a distance between a position of an outline of the trench and a position of an outline of the aperture, to thereby determine a three-dimensional structure;

a three-dimensional simulator (30), which performs a three-dimensional analysis process of executing a three-dimensional simulation using a three-dimensional structural body, which is defined by said two-dimensional layout determination tool and said three-dimensional structure determination tool, as a model to determine a light intensity deviation D that indicates a deviation of intensities of light transmitted through each of a pair of adjacent apertures, designed to realize a phase shift of 180 degrees with respect to each other, when light is transmitted through the apertures under same exposure conditions; and a two-dimensional simulator (40), which performs a two-dimensional analysis process of executing two-dimensional simulations using a two-dimensional structural body, which is defined by said two-dimensional layout, as a model to determine a transmittance T, such that, when for a pair of adjacent apertures, a light transmittance of one aperture is set to 100% and a light transmittance of another aperture is set to T %, a deviation in intensities of light transmitted through each of said pair of adjacent apertures becomes equal to said light intensity deviation D, and performs a layout correction process of executing two-dimensional simulations using a model, with which said transmittance T is applied to the two-dimensional structural body defined by said two-dimensional layout, to correct said two-dimensional layout.

13. The phase shift mask designing device as set forth in claim 12 wherein when the two-dimensional simulator performs the two-dimensional analysis process, a light intensity deviation D is determined for each of a plurality of transmittances, and a transmittance, which provides a result matching the light intensity deviation D determined by the three-dimensional analysis process performed by the three-dimensional simulator, is determined as the transmittance T.

14. The phase shift mask designing device as set forth in claim 12, wherein:

a database (55), in which light intensity deviations D, each defined as a value that indicates a deviation of intensities of light transmitted through each of a pair of adjacent apertures, which are of a predetermined three-dimensional structural body and are designed to realize a phase shift of 180 degrees with respect to each other, when light is transmitted through the apertures under the same conditions, are stored according to various different combinations of parameter values of the width Wx in the X-direction of an aperture, the width Ws of an opaque part, and the undercut amount Uc; and a light intensity deviation determination tool (50), which determines a specific light intensity deviation D by searching said database using specific parameter values determined by the two-dimensional layout determination tool and the three-dimensional structure determination tool;

are provided as an alternative means to the three-dimensional simulator.

15. The phase shift mask designing device as set forth in claim 14, wherein a database, having the width Wy in the Y-axis direction of an aperture in addition as a parameter value, is prepared.

16. The phase shift mask designing device as set forth in claim 14, wherein in order to accommodate for a two-dimensional layout, with which a plurality of apertures are positioned in two-dimensional matrix form in the X-axis direction and the Y-axis direction, two parameters of a width Wsx in the X-axis direction of an opaque part existing between apertures that are adjacent in the X-axis direction and a width Wsy in the Y-axis direction of an opaque part existing between apertures that are adjacent in the Y-axis direction are used as parameter values in the database as the width Ws of the opaque parts.

17. The phase shift mask designing device as set forth in claim 14, wherein in a case where a combination of parameter values that matches search conditions does not exist among combinations of parameters prepared inside the database, the light intensity deviation determination tool, transmittance determination tool, or correction amount determination tool performs an interpolation operation using parameter values that are close to determine the light intensity deviation D, transmittance T, or correction amount δ.

18. The phase shift mask designing device as set forth in claim 12, wherein:

a database (65), in which light intensity deviations D, each defined as a value that indicates a deviation of intensities of light transmitted through each of a pair of adjacent apertures, which are of a predetermined two-dimensional structural body and with which a transmittance of one has been set to 100% and a transmittance of the other has been set to T %, when light is transmitted through the apertures under the same conditions, are stored according to various different combinations of parameter values of the width Wx in the X-direction of an aperture, the width Ws of an opaque part, and the transmittance T; and a transmittance determination tool (60), which searches said database using specific parameter values determined by the two-dimensional layout determination tool and a specific light intensity deviation D determined by the three-dimensional simulator to determine a transmittance T, by which a light intensity deviation equal to said specific light intensity deviation D is obtained;

are provided as an alternative means to the two-dimensional simulator for executing the two-dimensional analysis process.

19. The phase shift mask designing device as set forth in claim 12, wherein:

a database (75), in which correction amounts δ, each of which concerns widths of the respective apertures and is required to make equal the intensities of light transmitted under the same conditions through each of a pair of adjacent apertures, which are of a predetermined two-dimensional structural body, are of the same size, and with which a transmittance of one has been set to 100% and a transmittance of the other has been set to T %, are stored according to various different combinations of parameter values of the width Wx in the X-direction of an aperture, the width Ws of an opaque part, and the transmittance T; and a correction amount determination tool (70), which searches said database using specific parameter values determined by the two-dimensional layout determination tool and a specific transmittance T determined by the two-dimensional analysis process performed by the two-dimensional simulator to determine a correction amount δ for said two-dimensional layout;

are provided as an alternative means to the two-dimensional simulator for executing the layout correction process.

20. A device for designing a phase shift mask, having a substrate (200) with a transparent property, and an opaque layer (100) formed on said substrate and having an opaque property, wherein a plurality of rectangular apertures are formed in said opaque layer, a two-dimensional layout pattern is formed by opaque parts (120) comprising regions at which said opaque layer is formed, and transparent parts (110) comprising regions at which said apertures are formed, and for a pair of adjacently disposed apertures, so that a phase of light transmitted through one of said pair of adjacent apertures will be shifted by 180 degrees with respect to a phase of light transmitted through another of said pair of adjacent apertures, a trench (220), having a predetermined depth and an outline greater than an outline of said one aperture, is formed on a portion of said substrate at which said one aperture is formed, said phase shift mask designing device comprising:

a two-dimensional layout determination tool (10), which, based on instructions from an operator, determines a width Wx in an X-axis direction and the width Wy in a Y-axis direction of an aperture and a width Ws of an opaque part on an XY plane defined on a surface of said substrate and positions a plurality of apertures of a same size at least along the X-axis to determine a two-dimensional layout on said XY plane;

a three-dimensional structure determination tool (20), which, based on instructions from an operator, determines whether or not phase shifting is to be performed for each of the plurality of apertures and determines, for apertures with which phase shifting is to be performed, a trench depth d and an undercut amount Uc, which indicates a distance between a position of an outline of the trench and a position of an outline of the aperture, to thereby determine a three-dimensional structure;

a first database (55), in which light intensity deviations D, each defined as a value that indicates a deviation of intensities of light transmitted through each of a pair of adjacent apertures, which are of a predetermined three-dimensional structural body and are designed to realize a phase shift of 180 degrees with respect to each other, when light is transmitted through the apertures under same conditions, are stored according to various different combinations of parameter values of the width Wx in the X-direction of an aperture, the width Ws of an opaque part, and the undercut amount Uc;

a light intensity deviation determination tool (50), which determines a specific light intensity deviation D by searching said first database using specific parameter values determined by said two-dimensional layout determination tool and said three-dimensional structure determination tool;

a second database (65), in which light intensity deviations D, each defined as a value that indicates a deviation of intensities of light transmitted through each of a pair of adjacent apertures, which are of a predetermined two-dimensional structural body and with which a transmittance of one has been set to 100% and a transmittance of the other has been set to T %, when light is transmitted through the apertures under the same conditions, are stored according to various different combinations of parameter values of the width Wx in the X-direction of an aperture, the width Ws of an opaque part, and the transmittance T;

a transmittance determination tool (60), which searches said second database using specific parameter values determined by said two-dimensional layout determination tool and a specific light intensity deviation D determined by said light intensity deviation determination tool to determine a transmittance T, by which a light intensity deviation equal to said specific light intensity deviation D is obtained;

a third database (75), in which correction amounts δ, each of which concerns widths of the respective apertures and is required to make equal the intensities of light transmitted under the same conditions through each of a pair of adjacent apertures, which are of a predetermined two-dimensional structural body, are of the same size, and with which a transmittance of one has been set to 100% and a transmittance of the other has been set to T %, are stored according to various different combinations of parameter values of the width Wx in the X-direction of an aperture, the width Ws of an opaque part, and the transmittance T; and a correction amount determination tool (70), which searches said third database using specific parameter values determined by said two-dimensional layout determination tool and a specific transmittance T determined by said transmittance determination tool to determine a correction amount S for said two-dimensional layout.

* * * * *